United States Patent
Brown

(10) Patent No.: US 8,401,013 B2
(45) Date of Patent: Mar. 19, 2013

(54) CONGESTION MANAGEMENT IN A NETWORK

(75) Inventor: David A. Brown, Carp (CA)

(73) Assignee: Mosaid Technologies Incorporated, Ottawa, ON ( * ) Notice: Subject to any disclaimer, the term of this patent is extended or adjusted under 35 U.S.C. 154(b) by 229 days.

(21) Appl. No.: 12/900,395

(22) Filed: Oct. 7, 2010

(65) Prior Publication Data

US 2011/0019546 A1  Jan. 27, 2011

Related U.S. Application Data

(63) Continuation of application No. 11/839,184, filed on Aug. 15, 2007, now Pat. No. 7,830,877, which is a continuation of application No. 10/156,725, filed on May 24, 2002, now Pat. No. 7,277,426.

(51) Int. Cl.
*H04L 12/28* (2006.01)

(52) U.S. Cl. .......................... 370/389; 370/378

(58) Field of Classification Search ............... 370/368, 370/371, 374, 378, 381, 383, 395.31, 395.32, 370/395.7, 395.71, 389, 356, 359, 360
See application file for complete search history.

(56) References Cited

U.S. PATENT DOCUMENTS

| | | |
|---|---|---|
| 5,032,987 A | 7/1991 | Broder |
| 5,129,074 A | 7/1992 | Kikuchi et al. |
| 5,371,499 A | 12/1994 | Graybill et al. |
| 5,473,607 A | 12/1995 | Hausman et al. |
| 5,528,592 A | 6/1996 | Schibler et al. |
| 5,802,054 A | 9/1998 | Bellenger |
| 5,914,938 A | 6/1999 | Brady et al. |
| 5,920,900 A | 7/1999 | Poole et al. |
| 5,949,786 A | 9/1999 | Bellenger |
| 5,991,297 A | 11/1999 | Palnati et al. |
| 6,034,958 A | 3/2000 | Wicklund |
| 6,091,725 A | 7/2000 | Cheriton et al. |
| 6,115,802 A * | 9/2000 | Tock et al. ............... 711/216 |
| 6,430,184 B1 | 8/2002 | Robins et al. |
| 6,560,599 B1 | 5/2003 | Boa et al. |
| 6,690,667 B1 | 2/2004 | Warren |
| 6,775,281 B1 | 8/2004 | Brown |
| 6,862,287 B2 | 3/2005 | Brown |
| 7,069,268 B1 | 6/2006 | Burns et al. |
| 7,180,899 B2 | 2/2007 | De Silva et al. |
| 7,346,063 B1 * | 3/2008 | Herbst ................. 370/395.7 |
| 2003/0142676 A1 * | 7/2003 | Zeisz et al. ............. 370/395.1 |

FOREIGN PATENT DOCUMENTS

EP  0 365 337 A2  4/1990

\* cited by examiner

*Primary Examiner* — Brenda H Pham
(74) *Attorney, Agent, or Firm* — Chapin IP Law, LLC

(57) ABSTRACT

Management of congestion level, in a computer-related context, is disclosed. Also disclosed is a system generating a plurality of computer network-related tables during system operation. A number of the tables are each separately indexed by a different index. The system includes at least one tangible computer-readable medium adapted to store, at each indexed location, a swap count providing an indication of the congestion level of the indexed location. The system also includes insert logic stored as instructions on the at least one medium for execution. When executed, the insert logic is operable to: i) insert, when a predetermined condition has been satisfied, a new entry by overwriting the current entry stored in the indexed location having the lowest swap count; and ii) update the swap counts in each of the indexed locations in a manner that maintains the total swap count at least substantially constant over time.

22 Claims, 18 Drawing Sheets

| 105 | /210 | | | | | | | | 0 |
|---|---|---|---|---|---|---|---|---|---|
| AGE FLAG | REMOTE CACHE REFRESH FLAG | LEARN PORT NUMBER | ADDR. ASSOC QOS VALID | ADDR. ASSOC QOS | LOGICAL PORT FORWARD VECTOR | NOT USED | STATIC ENTRY | TYPE | VALID ENTRY | KEY |
| 402 | 404 | 406 | 408 | 410 | 412 | | 414 | 416 | 418 | 420 |

(columns divided at bit positions 96 and 59)

FIG.4

CONGESTION MANAGEMENT IN A NETWORK

RELATED APPLICATIONS

This application is a continuation application claiming priority to earlier filed U.S. patent application Ser. No. 11/839,184 entitled "Congestion Level Management in a Network Device", filed on Aug. 15, 2007, now U.S. Pat. No. 7,830,877, which is a continuation of U.S. application Ser. No. 10/156,725 entitled "Method and Apparatus for Reordering Entries in a Multi Probe Lookup" (U.S. Pat. No. 7,277,426) filed May 24, 2002, the entire teachings of which are incorporated herein by this reference.

BACKGROUND OF THE INVENTION

In a computer network, a networking switch receives data packets from a number of ingress ports connected to the switch and forwards the data packets to a number of egress ports connected to the switch. The switch determines the egress port to which the data packets are forwarded dependent on a destination address included in the data packet received at one of the ingress ports.

The egress ports to which data packets are to be forwarded based on a destination address are stored in a forwarding entry in a forwarding table in networking switch. The forwarding table is searched for the forwarding entry associated with a particular destination address.

In general it is not feasible provide an entry in the forwarding table for each possible destination address accessible through the switch. For example, for a 48 bit Ethernet destination address that is, a Media Access Control ("MAC") address, $2^{48}$ forwarding entries are required in the forwarding table to store forwarding information for all the possible MAC addresses. Instead, only a portion of the MAC addresses are stored in a hash table. A hash function is performed on the destination address to provide a smaller number which is then used to index the hash table.

As a result of performing a hash function on the destination address, multiple destination addresses may map to the same index, that is, aliasing may occur. Thus, an insert of an entry into a location in the hash table may be blocked if the location is already storing ct forwarding entry for another destination.

One approach to the problem of aliasing is to generate a second hash function for the destination address in order to provide a second index if the forwarding entry is not forwarding at the first index. However, multiple levels of hashing results in a non-deterministic search by adding delay to the search for the forwarding entry.

One well-known technique for reducing aliasing and providing a deterministic search is to provide more than one location at each index. This is also called the multiple bucket technique. In a hash table implementing multiple buckets, a pre-determined number of locations or buckets are provided at each index.

FIG. 1A illustrates a block diagram of a prior art multi-bucket hash table 136. The hash table 136 includes $2^{15}$ indices (through index bits 14:0) 134. There are four buckets 138A-D at each index 134. Each of the buckets 138A-D stores one forwarding entry. The size of the hash table 136 is determined by the size of the location 138A-D and the total number of indices 134. For example, if each bucket 138A-D is one byte wide, a 128 Kilobytes (32 Kilobytes×4) hash table is required.

However, the multi-bucket hash table results in inefficient use of memory and an insert of a forwarding entry may be blocked if all the locations at an index are used. Thus, no further forwarding entries for destination addresses mapping to the index can be stored at that index in the hash table even though unused locations may be available at other indices in the hash table.

SUMMARY OF THE INVENTION

Related U.S. patent application Ser. No. 09/409,184, filed Sep. 30, 1999, the entire teachings of which are incorporated herein by reference describes a lookup table including a plurality of hash tables for storing a forward entry for a key. Each hash table is a separate addressable memory. Hash function logic concurrently computes a separate index from a key for each hash table. By generating a plurality of separate indexes for the key, more entries can be stored in the lookup table because each index is shared by a different set of keys.

An entry for a key is inserted into one of the indexed locations associated with the key. The entry can be a forwarding decision for a packet received by a networking device if the networking device, is a bridge, the forwarding decisions are continuously relearned. Thus, if there is no empty location for storing the entry for the key, another entry for another key stored in one of the indexed locations is overwritten by the entry for the key. The other entry is re-inserted into the table when it is re-learned.

If all the indexed locations are already storing entries for other keys, one of the locations identified by the computed indexes is randomly selected and overwritten with the entry for the key. The insertion is performed in a single write operation to the lookup table without first reading the previously stored entry. The insert operation is only aware of the indexed locations associated with the key to be inserted and has no knowledge of how each of the indexed locations is shared with other keys.

Thrashing can occur if one of the indexed locations is continuously overwritten with different keys. For example, if index X is shared by Key A and Key B, thrashing occurs if the entry for Key A stored at the location identified by index X is overwritten to insert the entry for Key B, then the entry for Key B stored at the location identified by index X is overwritten to insert the entry for Key A. Even though Key A and Key B can be stored at other indexed locations, if the location to be overwritten is randomly selected, the same location can be selected for storing both Key A and Key B.

Thrashing is reduced by recording insert operations for all keys sharing the indexed location allowing the indexed location with the lowest congestion to be identified for a particular key. The lookup table includes a plurality of tables. Each table is separately indexed by a different index generated from a key. Each indexed location stores a swap count. The swap count provides an indication of the congestion level of the indexed location; that is, the number of insert operations for all keys sharing the indexed location. The lookup table also includes insert logic. Upon detecting all indexed locations in use, the insert logic selects the indexed location with the lowest swap count and inserts a new entry by overwriting the current entry in the selected location. The insert logic updates the swap counts in each of the indexed locations.

The insert logic updates the swap counts by incrementing a first swap count associated with the overwritten indexed location and decrementing the second swap counts associated with the other indexed locations. Upon detecting a plurality of indexed locations storing the lowest swap count, one oft he indexed locations is randomly selected for inserting the new entry.

The first swap count is incremented by the number of second swap counts and each of the second swap counts is decremented by one. The number of second swap counts may be 3.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a block diagram illustrating the format of a forwarding entry stored in any one of the hash tables shown in FIG. 1B;

DETAILED DESCRIPTION OF THE INVENTION

Figure 1A:
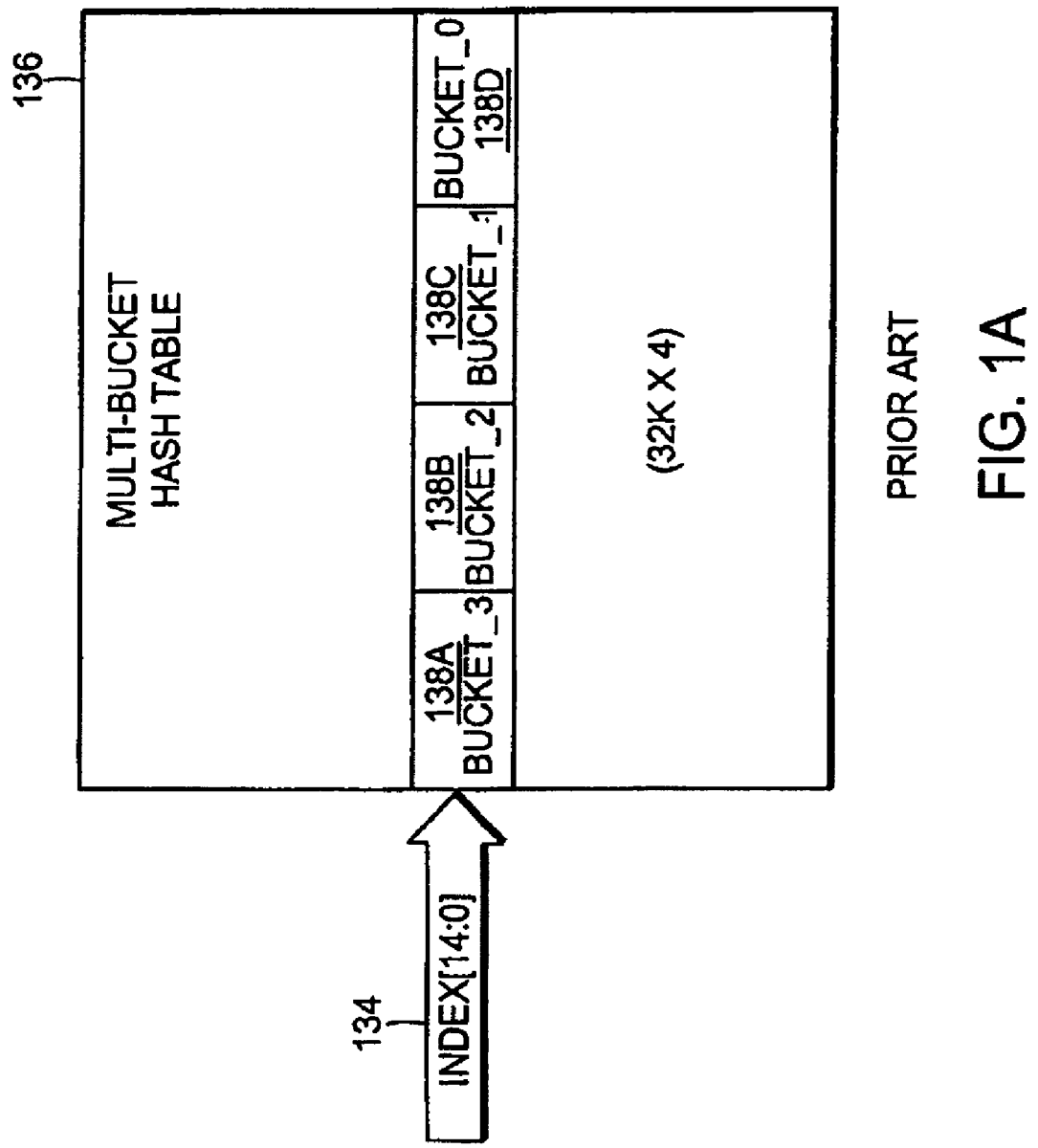
FIG. 1A is a block diagram of a prior art multi-bucket hash table for providing forwarding entries.

A description of preferred embodiments of the invention follows. FIG. 1B is a block diagram illustrating hash tables 190A-D in a network switch for storing forwarding entries according to the principles of the present invention. Each of the hash tables 190A-D provides only $2^{13}$ indices, with one location at each index for storing a forwarding entry. The combined hash tables 190A-D have $2^{15}$ ($2^{13} \times 2^2$) indices. Thus, the four hash tables 190A-D provide the same number of indices as the prior art multi-bucket hash table shown in FIG. 1A, in a hash table that is one fourth the size of prior art multi-bucket hash table. The number of locations at each index and the number of bits per location is a design choice and not a limitation of the invention.

Four different indices are computed concurrently by hash function logic dependent on a destination address. The hash function logic is described further with reference to FIG. 3. Each of the computed indices is provided to a different hash table 190A-D. For example, four different indices are generated dependent on Key_A, that is, Key_A index 1-4 172A-D. A forwarding entry for a key is inserted in one of the locations identified by one of the four computed indices so that on a subsequent search for the key, the key is located in one search cycle.

For example, in order to provide a forwarding entry for Key_A in one search cycle, Key_A must be stored in one of the locations 138, 146, 156 164 identified by Key_A Index 1-4 176A-D. If all of the locations 138, 146, 156, 164 are storing forwarding entries for other insert keys, one of the forwarding entries is moved to another location in one of the hash tables 190A-D in order to provide one of the locations 138, 146, 156, 164 for storing Key_A. A method for reordering the forwarding entries stored in the hash tables 190A-D is described in conjunction with FIG. 8.

As shown, the four Key_A indices 172A-D identify location 138 in hash table_1 190A, location 146 in hash table_2 190B, location 156 in hash table_3 190C and location 164 in hash table_4 190D. All the locations 138, 146, 156, 164 are storing forwarding entries for keys other than Key_A. Key_B is stored in location 138, Key_C is stored in location 146, Key_D is stored in location 156 and Key_E is stored in location 164. Unused or empty locations are available in the hash tables; for example, locations 140, 142, 144 are unused in hash table 1 190A.

In order to provide a deterministic search, that is, switching without queuing Key_A must be stored in one of the locations identified by the indices for Key_A 172A-D. Thus, one of the keys stored in locations 138, 146, 156, 164 must be moved to an unused location, so that a forwarding entry for Key_A can be stored in the emptied location, and the forwarding entry for the key that is moved is stored in a location identified by one of the moved key's other indices.

Key A shares location 138 with Key B. An entry for Key B stored at location 138 can therefore be moved to an empty location identified by any of the other indices for Key_B 174B-D. As shown, the other locations 148, 158, 166 identified by the other indices for Key_B 174B-D are used; therefore, Key_B can not be moved to one of the other locations 148, 158, 166. However, two of the locations 140, 168 identified by two of the other indices for Key_C 176A, 176D are empty. Thus, the forwarding entry for Key_C may be moved from location 146 to location 168 or 140. After moving the forwarding entry for Key_C, the forwarding entry for Key_A is inserted into location 146 identified by key_A index_2 172B. A search for the forwarding entry for Key_A or Key_C is deterministic, that is, each of the searches can be completed in one search cycle. Similarly, forwarding entries for Key_D could have been moved from location 156 to location 142, 150 or 170 to provide location 156 for inserting Key_A, or, Key_E could have been moved from location 164 to location 144, 152 or 162 to provide location 164 for inserting Key_A.

Thus, in order to provide a deterministic search for each forwarding entry stored in the hash tables 190A-D, the forwarding entries stored in the hash tables 190A-D are reordered so that a forwarding entry for a destination address is stored at one of the computed indices for the destination address.

Figure 1B:
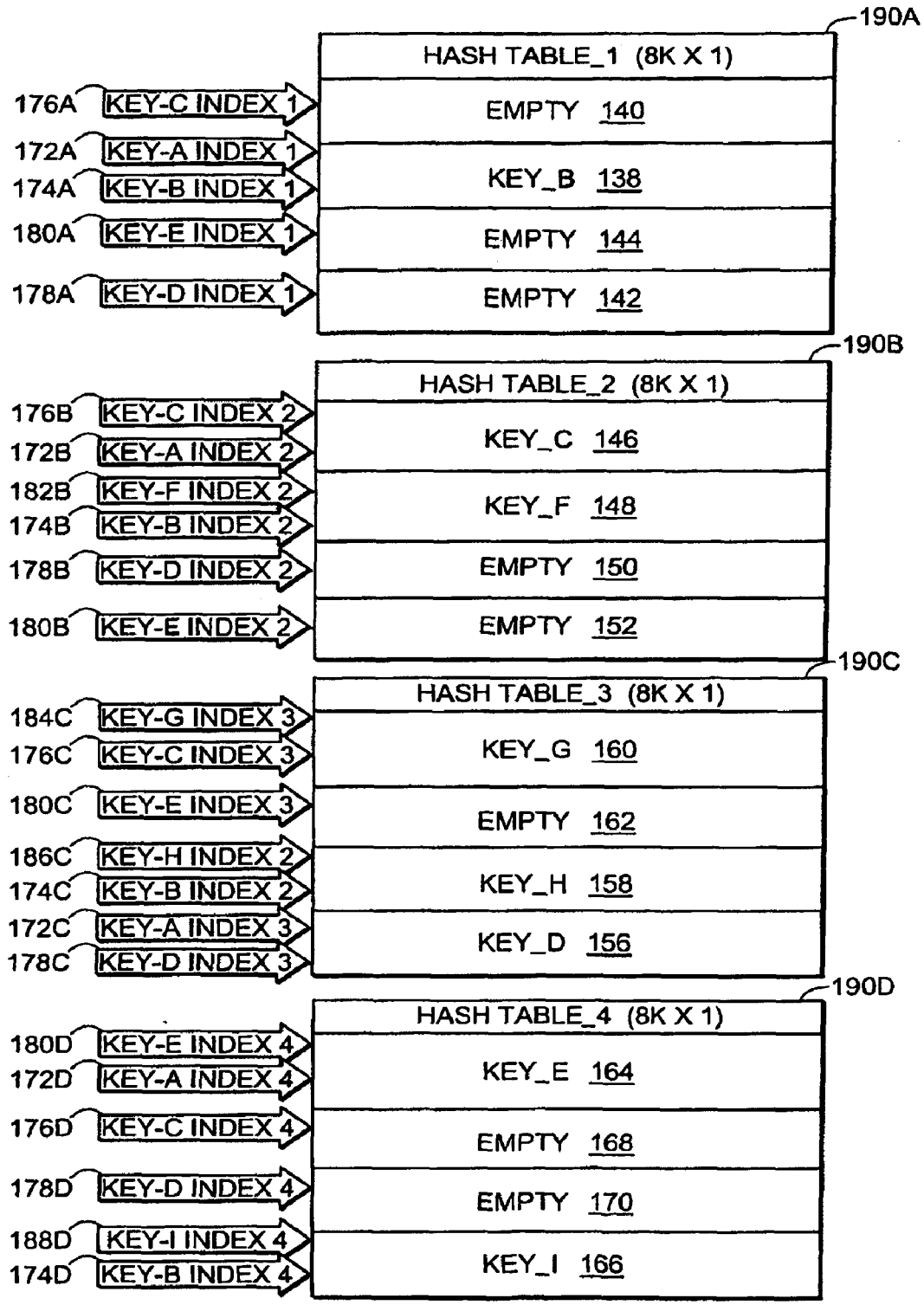
FIG. 1B is a block diagram illustrating hash tables for providing forwarding entries according to the principles of the present invention.

A comparison of the approach of the present invention to the prior art approach presented in FIG. 1A is facilitated by considering the expansion of the individual index locations of FIG. 1B to include four buckets each, each as illustrated in FIG. 1A. Such a configuration uses the same 32K×4 memory as FIG. 1A. Each index into the hash table similarly offers four forwarding entries which might be a proper match to the destination address, but there are four indices into the hash table for each key as opposed to the single index of FIG. 1A.

With the present invention, there is a greater sharing of each index with other destination addresses. When inserting forwarding entries in the FIG. 1B approach, conflict at any one index is more likely because of the greater sharing, but overall the FIG. 1B approach with multiple indices per key and multiple buckets provides no more initial conflict in the insertion process. Advantageously, the present approach additionally offers the possibility of shifting otherwise blocking forwarding entries to other locations which are not shared with a particular key, thus offering greater flexibility in the insertion process. Any keys which might be in conflict at a particular index will not likely be in conflict at any other index to which a forwarding entry might be moved. This advantage is obtained regardless of whether multiple buckets are used, and the single bucket approach of FIG. 1B accomplishes this with a reduction in the memory area required by a factor of four.

Although the insertion process may require additional processing time for the relocation proportional to the level of recursion which is implementation dependent, time required to process an insertion is much less critical than the need to find a match in a single cycle during the routing process. With the present invention, such a match is substantially more probable. In fact, a match is almost certain within the bounds of total memory size.

Figure 1C:
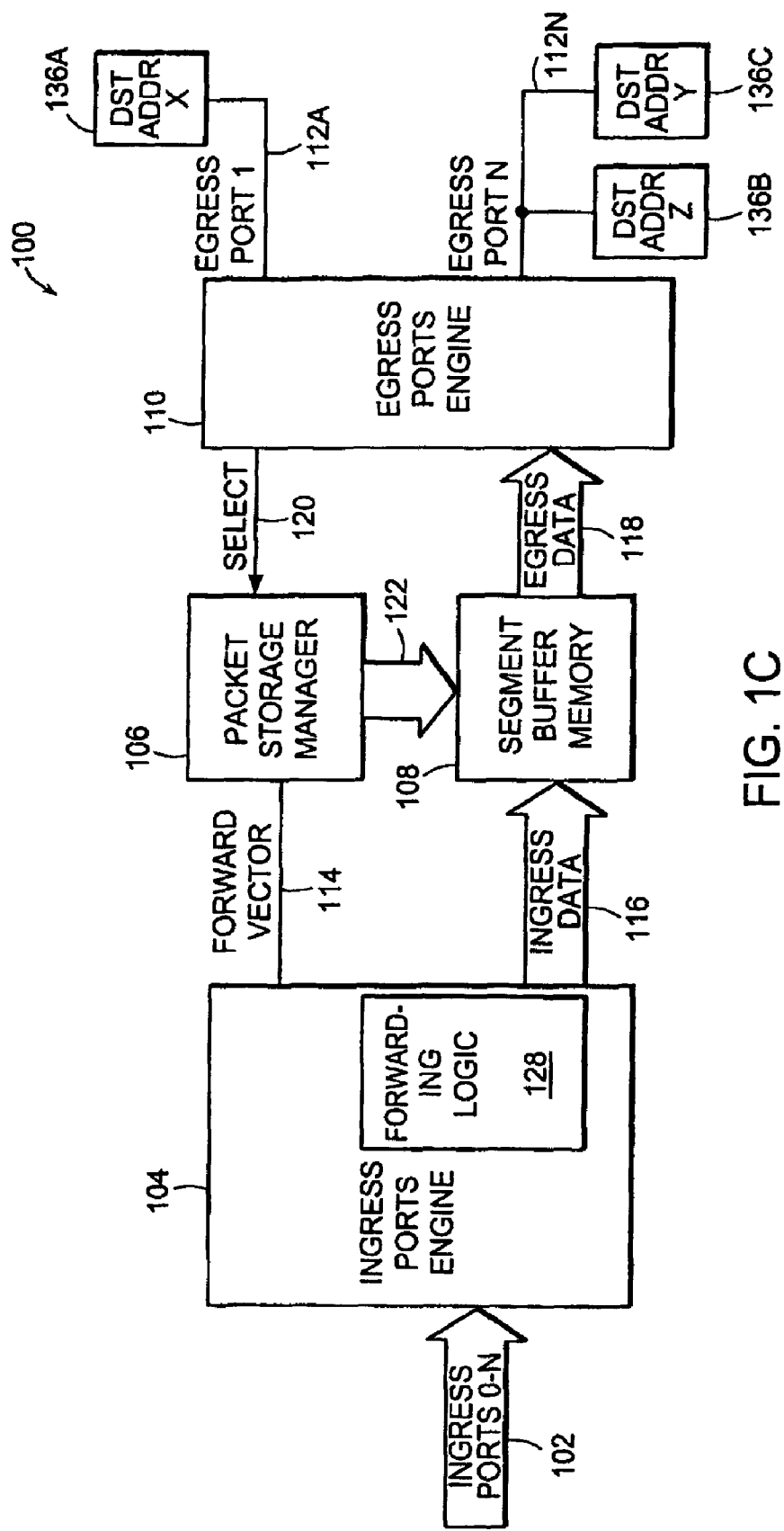
FIG. 1C is a block diagram of a non-blocking common memory switch in which the hash tables of FIG. 1B can be used.

FIG. 1C is a block diagram of a common memory switch 100 in which the hash tables shown in FIG. 1B may be used. All data received on ingress ports 102 is stored in segment buffer memory 108 before being switched to one or more egress ports 112. The packet storage manager 106 controls write and read access to the segment buffer memory 108.

The switch 100 includes an ingress ports engine 104 and an egress ports engine 110. A data packet is received serially at an ingress port 102. The ingress ports engine 104 detects and processes headers in the received data packet and selects a forward vector 114 stored in a forward entry for the data packet in the forwarding logic 128 in the ingress port engine 104. The forward vector 114 is a bit map, with a bit corresponding to each of the plurality of egress ports 112, indicating whether the data packet is to be forwarded to that egress port 112 dependent on the destination address in the header. The forward vector 114 is forwarded to the packet storage manager 106. For example, data packets with destination address X are forwarded through egress port_1 112A to the network node with destination address 136A, data packets with destination address Y are forwarded through egress port_N 112N to the network node with destination address Y 136C and data packets with destination address Z are forwarded through egress port_N 112N to the network node with destination address Z 136B.

The packet storage manager 106 provides access to the segment buffer memory 108. The packet storage manager 106 provides segment buffer memory addresses 122 for read and write operations to the segment buffer 108 and stores in the manager 106 the locations in the segment buffer memory 108 of each data packet stored. The egress engine 110 selects one of the plurality of egress ports 112, through select control signals 120, on which to transmit a data packet and provides the stored data packet to the selected egress port 112.

The segment buffer memory 108 is a common memory shared by all ingress ports 102 and egress ports 112. The switch 100 is non-blocking, that is, a data packet arriving at any of the ingress ports 102 is not blocked from being forwarded to any of the egress ports 112. The switch 100 provides concurrent processing by the ingress ports engine 104 of data packets received at ingress ports 102 and processing of stored data packets by the egress port engine 110 for egress ports 112.

Figure 1D:
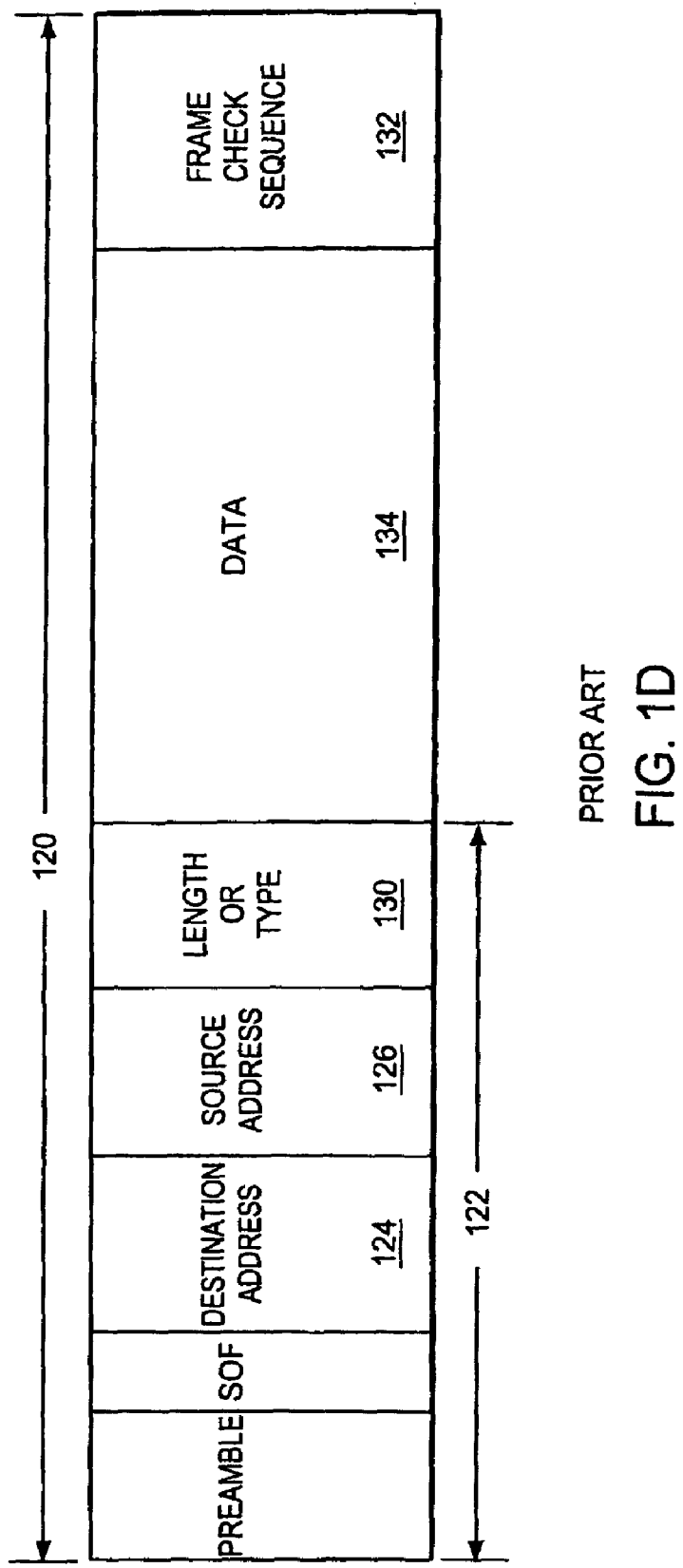
FIG. 1D is a block diagram of a prior art Ethernet data packet which may be received at an ingress port.

FIG. 1D is a block diagram illustrating a prior art Ethernet data packet 120 which may be received at an ingress port 102. The Ethernet data packet includes a header 122, data field 134, and a frame check sequence 132. The header 122 includes a destination address 124, a source address 126, and a length or type field 130. The source address 126 and the destination address 124 are unique 48 bit addresses identifying the physical device at the source and the destination respectively. The data packet may also include a 12 bit VLAN Identifier ("VID") (not shown). The size of the data packet 120 is dependent on the size of data field 134, which can vary from 46 bytes to 1,500 bytes.

Figure 2:
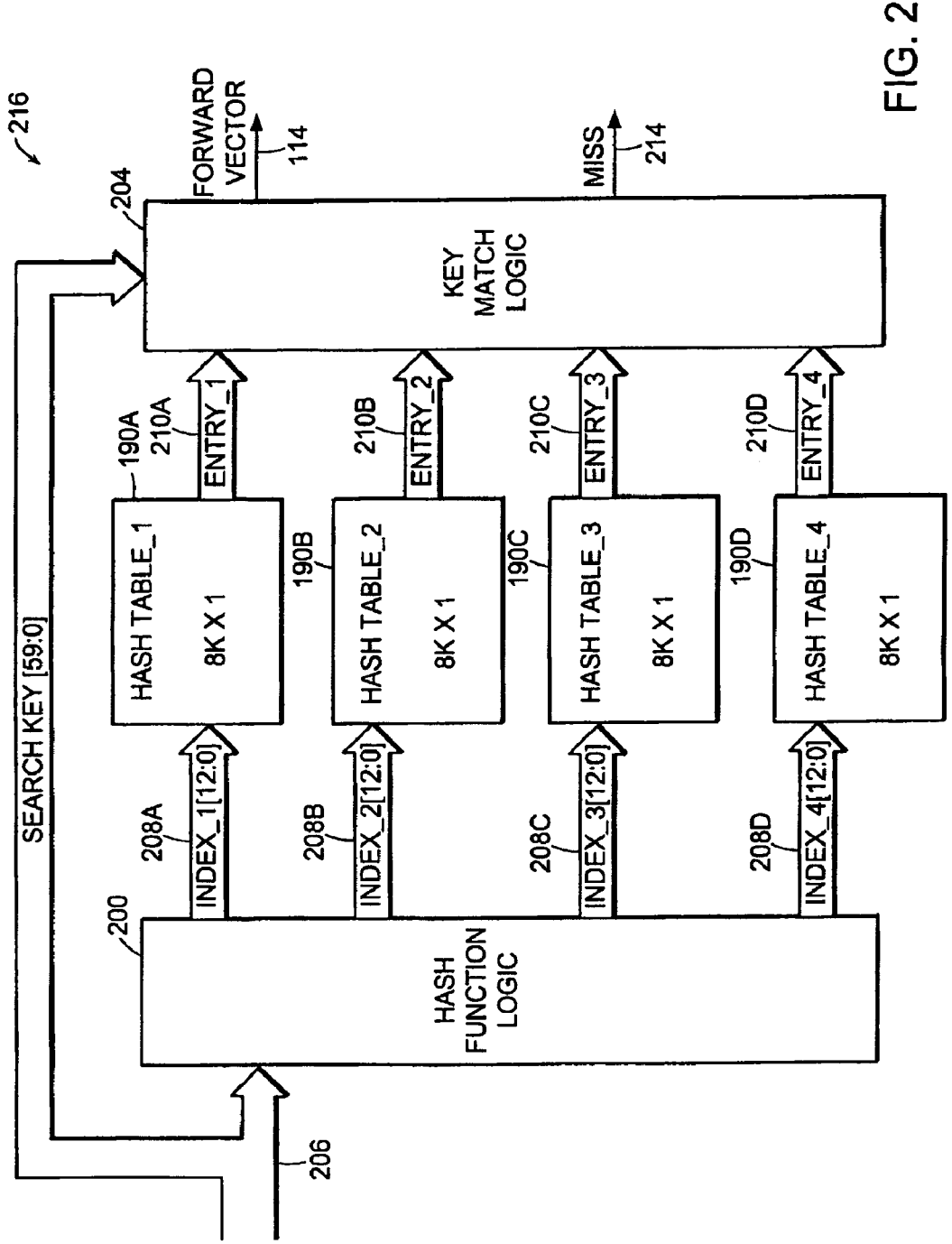
FIG. 2 is a block diagram illustrating the search logic including the hash tables in the forwarding logic shown in the non-blocking common memory switch in FIG. 1C.

FIG. 2 is a block diagram of the search logic 216 in the forwarding logic 128 shown in the ingress ports engine 104 in the non-blocking common memory switch 100 in FIG. 1C according to the principles of the present invention. The search logic 216 includes four hash tables 190A-D. The number of hash tables 190A-D is a design choice and not a limitation of the invention.

The search logic 216 also includes a hash function logic 200 and a key match logic 204. The hash function logic 200 concurrently generates four indices 208A-D dependent on a search key 206. The search key 206 is similar to a tag in cache memory. The key match logic 204 determines which of the four locations identified by the indices 208A-D stores a forwarding entry associated with the search key 206. Upon finding a matching forwarding entry, the forward vector 114 portion of the matching forwarding entry is forwarded to the packet storage manager 106 (FIG. 1C).

To search for the forwarding entry corresponding to a destination address in the header of a data packet, the ingress ports engine 104 examines the header 122 (FIG. 1D) of the data packet 120 as the data packet is being received from one of the ingress ports 102 (FIG. 1C). A copy of the 48 bit destination address 124 (FIG. 1D) is concatenated with a 12 bit VLAN IDentifier ("VID") to form a 60-bit search key 206. The concatenation of the destination address and the VID is a design choice and not a limitation of the invention, thus, the search key may be the destination address 124 (FIG. 1D). The search key 206 is forwarded to the hash function logic 200. The hash function logic 200 provides four thirteen bit indices 208A-D as a result of performing a hash function on the search key 206.

The invention is described for an Ethernet data packet 120 as shown in FIG. 1D. However, the invention is not limited to Ethernet data packets, it may be used to insert and search for forwarding entries for any other type of data packet.

Figure 3:
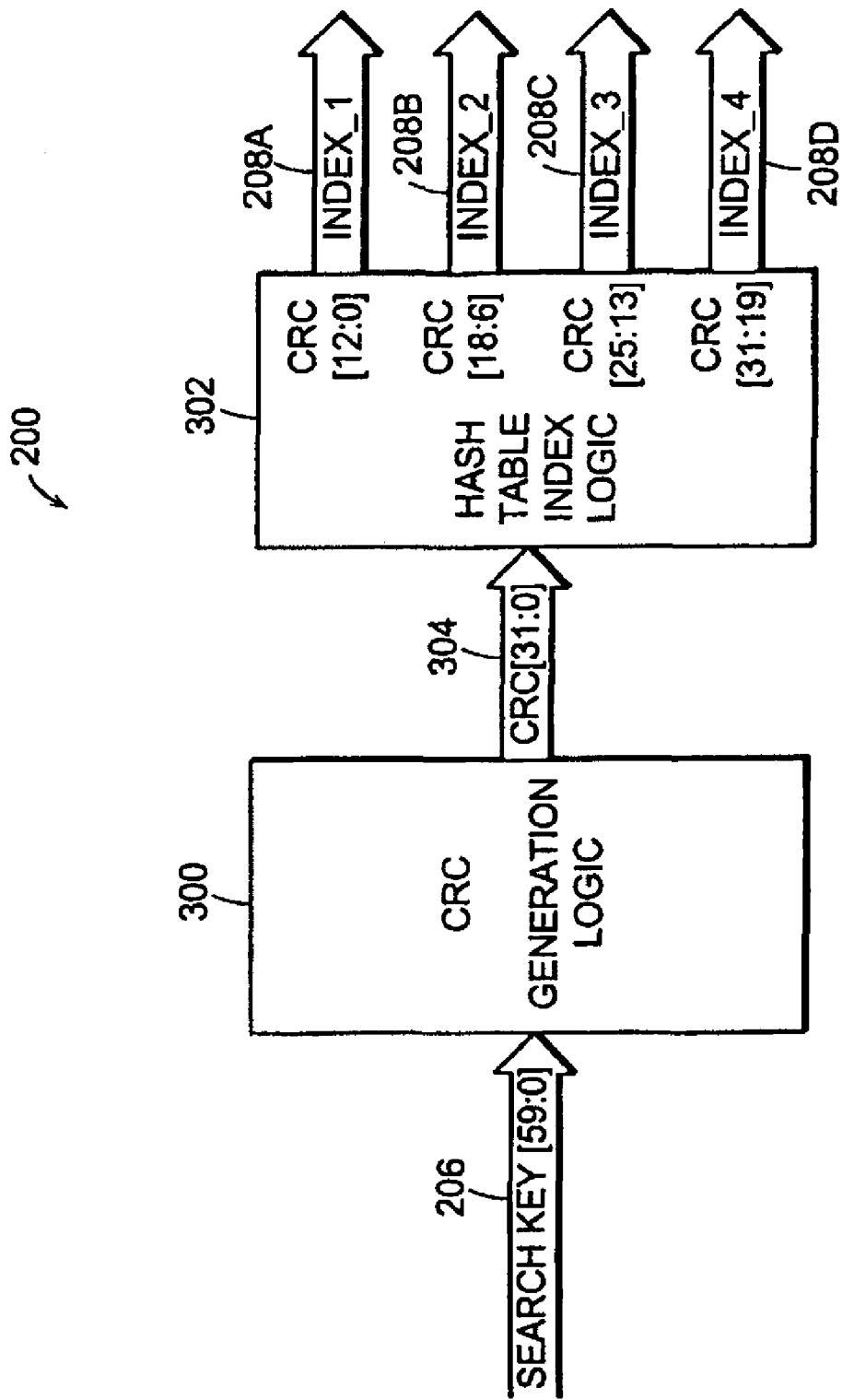
FIG. 3 is a block diagram illustrating hash function logic shown in FIG. 2.

FIG. 3 is a block diagram illustrating the hash function logic 200 shown in FIG. 2. The hash function logic 200 includes a Cyclic Redundancy Check ("CRC") generation logic 300 and a hash table index logic 302. The hash function is a CRC function which is performed on the search key 206 in the CRC generation logic 300. CRC generation logic is well known to those skilled in the art. The hash function is not limited to CRC generation, the hash function used may be any hash function used by those skilled in the art. The CRC generation logic 300 generates a 32 bit CRC 304 from the 60 bit search key 206.

The 32 bit CRC 304 is forwarded to the hash table index logic 302. The hash table index logic 302 generates four indices 208A-D from the 32 bit CRC 304. Each of the four indices 208A-D has 13 bits and thus provides 8K addresses to address the 8K locations in each of the hash tables 190A-D. The four indices 208A-D are generated by mapping bits of the 32 bit CRC 304 to the four indices 208A-D as follows: Bits 12:0 of the CRC 304 are mapped to Bits 12:0 of Index_1 208A; Bits 18:6 of the CRC 304 are mapped to Bits 12:0 of Index_2 208B; Bits 25:13 of the CRC 304 are mapped to Bits 12:0 of Index_3 208C and Bits 31:19 of the CRC 304 are mapped to Bits 12:0 of Index-4 208D.

Returning to FIG. 2, after the indices 208A-D have been generated by the hash function logic 200, the entries 210A-D stored at the locations in the hash tables 190A-D specified by the indices 208A-D are forwarded to the key match logic 204. The search key 206 is also forwarded to the key match logic 204.

FIG. 4 is a block diagram showing the format of a forwarding entry 210 stored in any one of the locations in hash tables 190A-D shown in FIG. 2. The forwarding entry 210 includes fields indicating where a data packet is to be forwarded. The forwarding entry 210 includes the following fields: an age flag 402, a remote cache refresh flag 404, a learn port number 406, address associated QoS valid 408, an address associated QoS 410, a logical port forward vector 412, a static entry indicator flag 414, a type flag 416, a valid entry indicator flag 418 and a key 420.

The one bit age flag 402 indicates the age of the forwarding entry 210. The one bit remote cache refresh flag 404 indicates if timeouts are enabled. The learn port number 406 indicates on which interface the MAC address stored in the key 420 in the forwarding entry was learned. For example, if the MAC address was learned on a local external access port, this is the physical ingress port number 104. The address associated Quality of Service ("QoS") field 410 indicates a management assigned quality of service for the address. The one bit address QoS associated valid 408 flag indicates whether the QoS field 410 is to be used for future queuing consideration. The 32 bit logical port forward vector 412 indicates to which ports the data packet is to be forwarded. The one bit static entry indicator flag 414 indicates whether the forwarding entry 210 is static or dynamic. The one bit type flag 416 indicates whether the forwarding entry 210 can be used for a level 2 forwarding entry. The one bit valid entry indicator flag 418 indicates whether the forwarding entry 210 is valid. The 60 bit key 420 stores the search key 206 associated with the forwarding entry 210.

Returning to FIG. 2, the key match logic 204 compares the key entry 420 stored in each of the forwarding entries 210A-D forwarded from the hash tables 190A-D with the search key 206. If there is a match, the 32 bit logical port forward vector 412 (FIG. 4) from that forwarding entry is forwarded on the forward vector 114 to the packet storage manager 106 (FIG. 1). If there is no match a miss signal 214 is generated and the miss is processed by the no match found logic (not shown) in the ingress ports engine 104.

Figure 5:
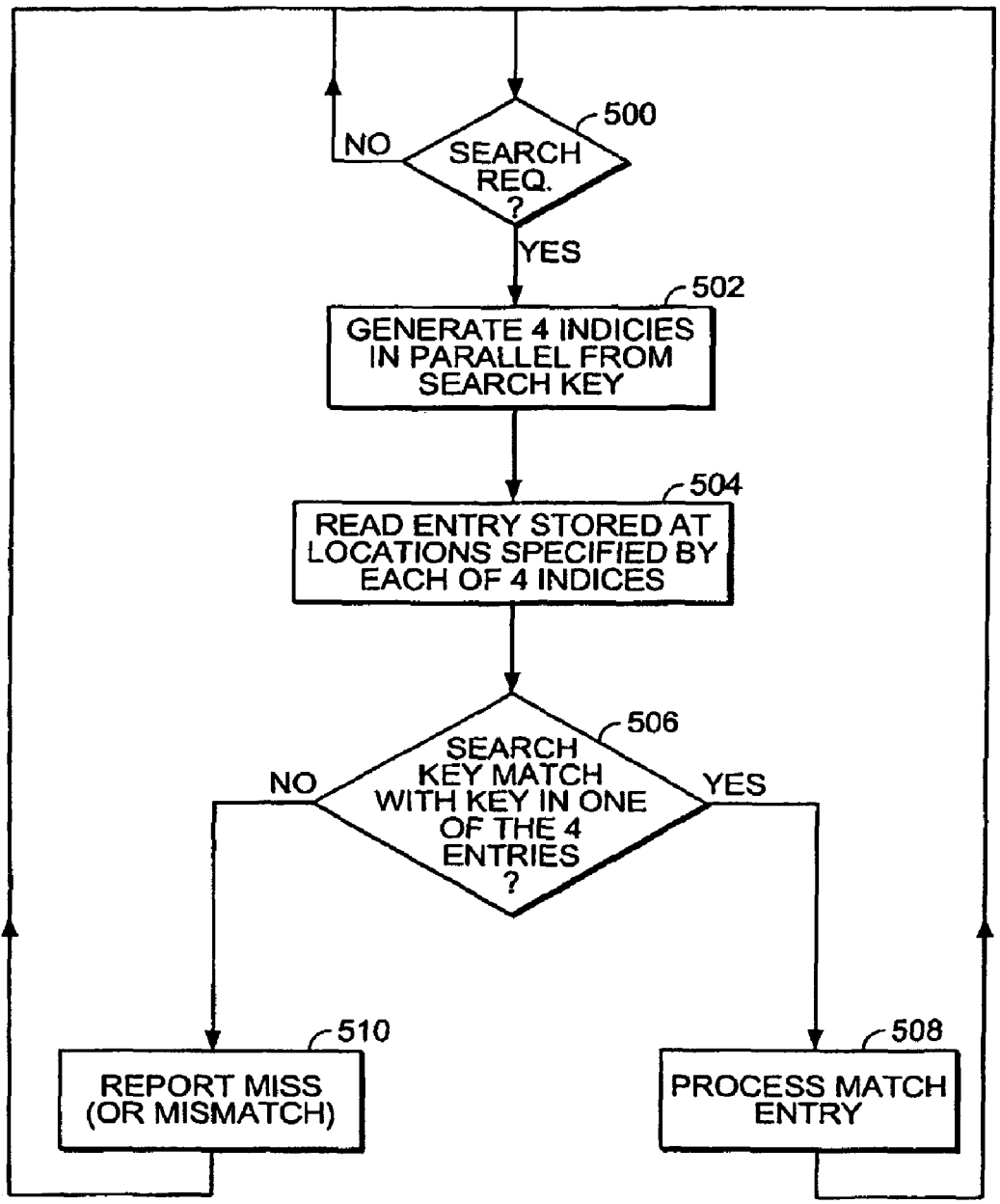
FIG. 5 is a flow graph illustrating the steps in the search logic for searching for a forwarding entry matching a search key in one of the hash tables.

FIG. 5 is a flow graph illustrating the steps in the search logic 216 for searching for a forwarding entry 210 matching a search key 206 in one of the hash tables 190A-D.

At step 500, the search logic 216 waits for a search request. If there is a search request processing continues with step 502. If not, the search logic 216 continues to wait for a search request.

At step 502, the hash function logic 200 generates four indices 208A-D from the search key 206 and forwards the four indices 208A-D to the hash tables 190A-D. Processing continues with step 504.

At step 504, the forwarding entries 210A-D stored at the locations in the hash tables 210A-D specified by the indices 208A-D are forwarded to the key match logic 204. Processing continues with step 506.

At step 506, the key match logic 204 compares the key 420 (FIG. 4) stored in each of the forwarding entries 210A-D with the search key 206 and determines if there is a match. If there is a match processing continues with step 508. If not, processing continues with step 510.

At step 508, the forwarding entry 210A-D for the search key 206 has been found. The logical port forward vector 412 (FIG. 4) stored in the forwarding entry 210 is forwarded on the forward vector 114 (FIG. 1C) to the packet storage manager 106 (FIG. 1C). The data packet is forwarded to the predetermined egress ports 112 through the packet storage manager 106, segment buffer memory 108 and the egress ports engine 110. Processing continues with step 500.

At step 510, a forwarding entry 210A-D matching the search key 206 has not been found. The ingress ports engine 104 processes the miss for example, by flooding, that is, sending the data packet to all of the egress ports 112. This process is part of the bridging protocol. Processing continues with step 500.

Figure 6:
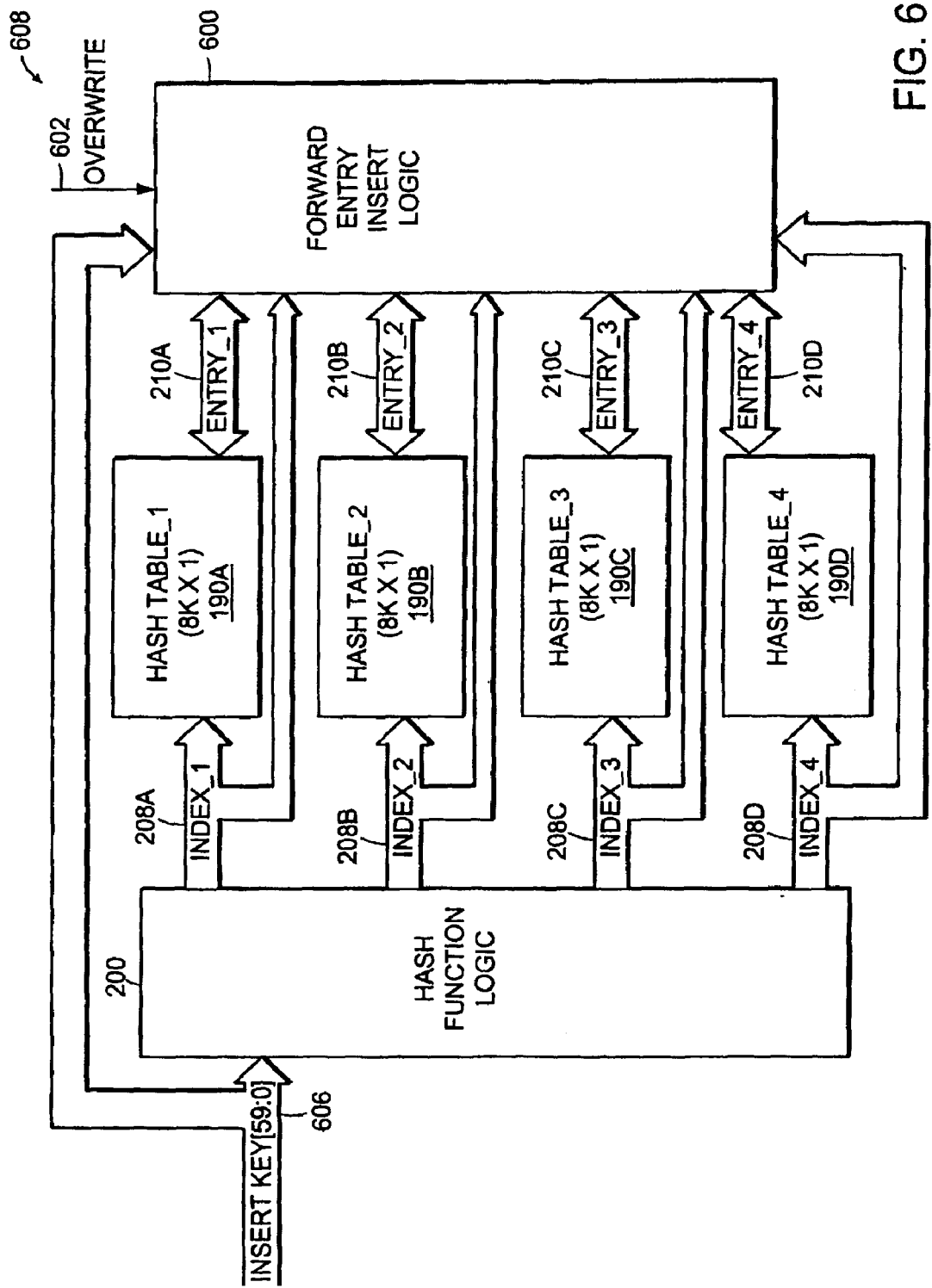
FIG. 6 is a block diagram illustrating the insert logic for inserting a new entry in one of the hash tables.

FIG. 6 is a block diagram illustrating the insert logic 608 in the forwarding logic 128 (FIG. 1C) for inserting a forwarding entry 210 in a location in one of the hash tables 190A-D. A copy of the 48 bit destination address 124 (FIG. 1D) is concatenated with a 12 bit VLAN IDentifier ("VID") to form a 60-bit insert key 606. The concatenation of the destination address and the VID is a design choice and not a limitation of the invention. The same hash function is performed on the insert key 606 as is performed on the search key 206. The hash function has already been described for the search key 206 in conjunction with FIG. 3. Four indices 208A-D are generated as a result of the hash function. Each of the indices identifies the location in a respective hash table 190A-D at which the insert key 606 may be inserted.

The contents of the forwarding entries 210A-D stored at the locations in the hash tables 190A-D identified by the indices 208A-D are forwarded to the forward entry insert logic 600. The forward entry insert logic 600 determines at which locations identified by the indices 208A-D to insert the insert key 606 dependent on the contents of the forwarding entries 210A-D and the state of the overwrite signal 602.

The forward entry insert logic 600 determines which of the locations identified by indices 208A-D are unused. If an unused location is found, a forwarding entry 210 including the insert key 606 is inserted in the unused location identified by the index 208 to the unused location. If no unused location is found and the overwrite signal 602 indicates that overwrite is enabled, one of the indices 208A-D is randomly selected and a forwarding entry including the insert key 606 is inserted in the location identified by the selected index 208.

If all the locations are used and the overwrite signal 602 indicates that overwrite is not enabled, a reordering of forwarding entries stored in the hash tables 190A-D is performed in order to provide an unused location identified by the indices 208A-D to insert a forwarding entry including the insert key 606. A method for reordering forwarding entries 210A-D in the hash tables 190A-D is described in conjunction with FIG. 8.

Figure 7:
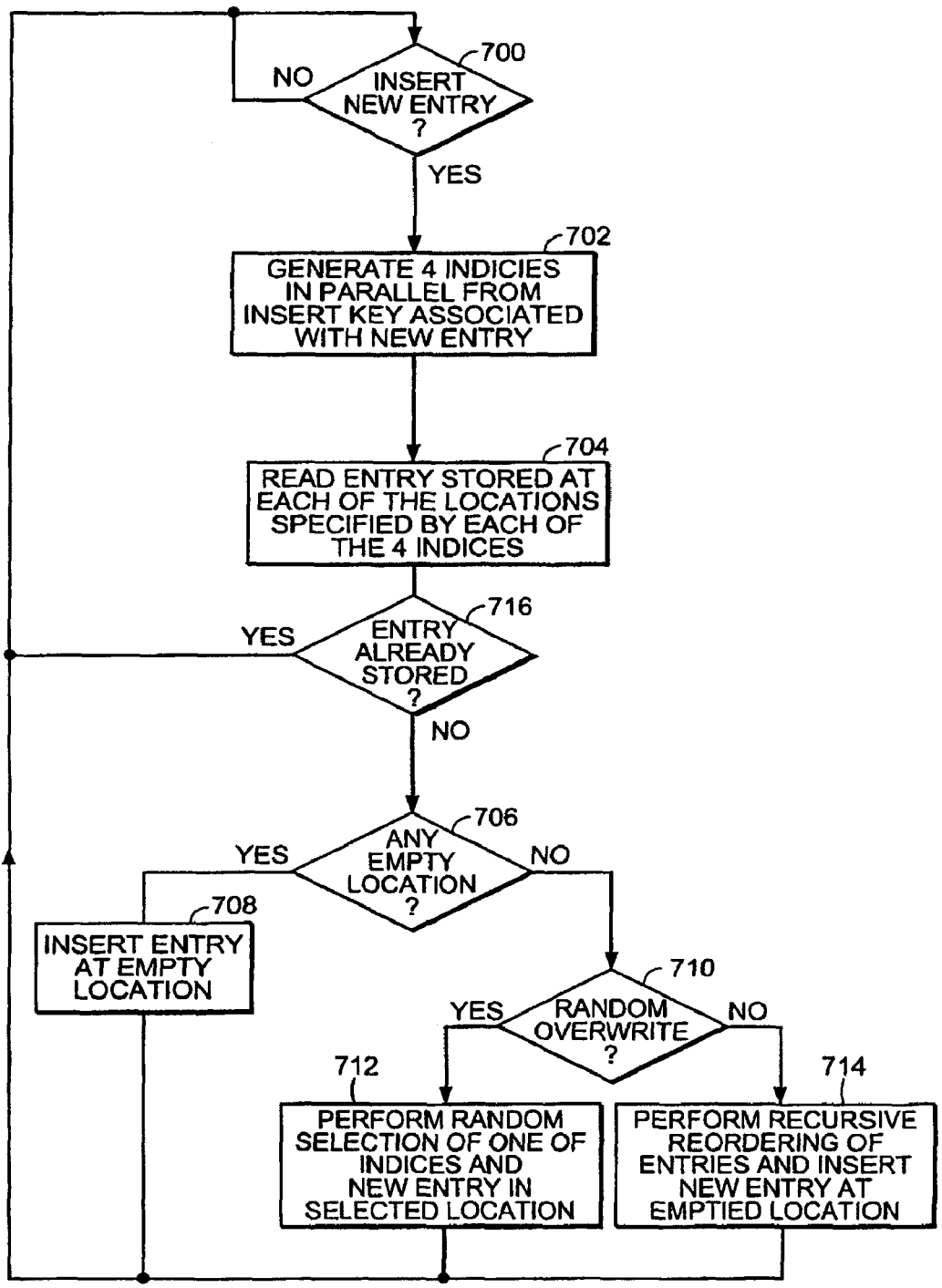
FIG. 7 is a flow chart illustrating the steps in the insert logic shown in FIG. 6 for inserting a forwarding entry into one of the hash tables by overwriting a used entry.

FIG. 7 is a flow chart illustrating the steps in the insert logic 608 shown in FIG. 6 for inserting a forward entry 210 including an insert key 606 in a location in one of the hash tables 190A-D.

At step 700, the hash function logic 200 receives a request to insert a forwarding entry in a location in one of the hashing tables 190A-D. Processing continues with step 702.

At step 702, the hash function logic 200 concurrently generates four indices 208A-D in parallel from the insert key 606. The generation of the indices 208A-D has already been described in conjunction with FIG. 3. Processing continues with step 704.

At step 704, the contents of the locations in the hash tables 190A-D identified by the generated indices 208A-D are forwarded to the forward entry insert logic 600. Processing continues with step 716.

At step 716, if the insert key 606 is already stored in a location identified by the generated indices 208A-D, processing continues with step 700 to wait for another request to insert a forwarding entry. If the insert key 606 is not already stored, processing continues with step 706 to select one of the indexed locations to store the insert key.

At step 706, the forward entry insert logic 600 (FIG. 6) determines from the forwarded contents whether any of the locations are unused. For example, by examining the valid entry field 418 (FIG. 4) in the forwarding entry 210. If one of the locations is unused, processing continues with step 708. If all the locations identified by the generated indices 208A-D are used, processing continues with step 710.

At step 708, the forward entry insert logic 600 (FIG. 6) inserts a forwarding entry 210 including the insert key 606 in a location identified by one of the generated indices 190A-D identifying an unused location.

At step 710, the forward entry insert logic 600 (FIG. 6) determines if overwrite is enabled dependent on the state of the overwrite signal 602 (FIG. 6). Overwrite is set if a single cycle insert is required and the forwarding entries in the hash tables are continually updated for example, if the hash tables 190A-D are being used in an Ethernet bridge. If overwrite is enabled, processing continues with step 712. If overwrite is not enabled, processing continues with step 714.

At step 712, the forward entry insert logic 600 (FIG. 6) selects an used location identified by any one of the generated indices 208A-D in which to overwrite a forwarding entry including the insert key 606.

At step 714, the forward entry insert logic 600 (FIG. 6) performs reordering of the forwarding entries 210A-D stored in locations identified by the generated indices 208A-D in order to move one of the forwarding entries to a location specified by another index in one of the hash tables 190A-D. A method for reordering is described in conjunction with FIG. 8. After the reordering is complete and an unused location is provided at one of the locations identified by the generated indices 208A-D, a forwarding entry 210 including the insert key 606 is inserted in the unused location.

Figure 8:
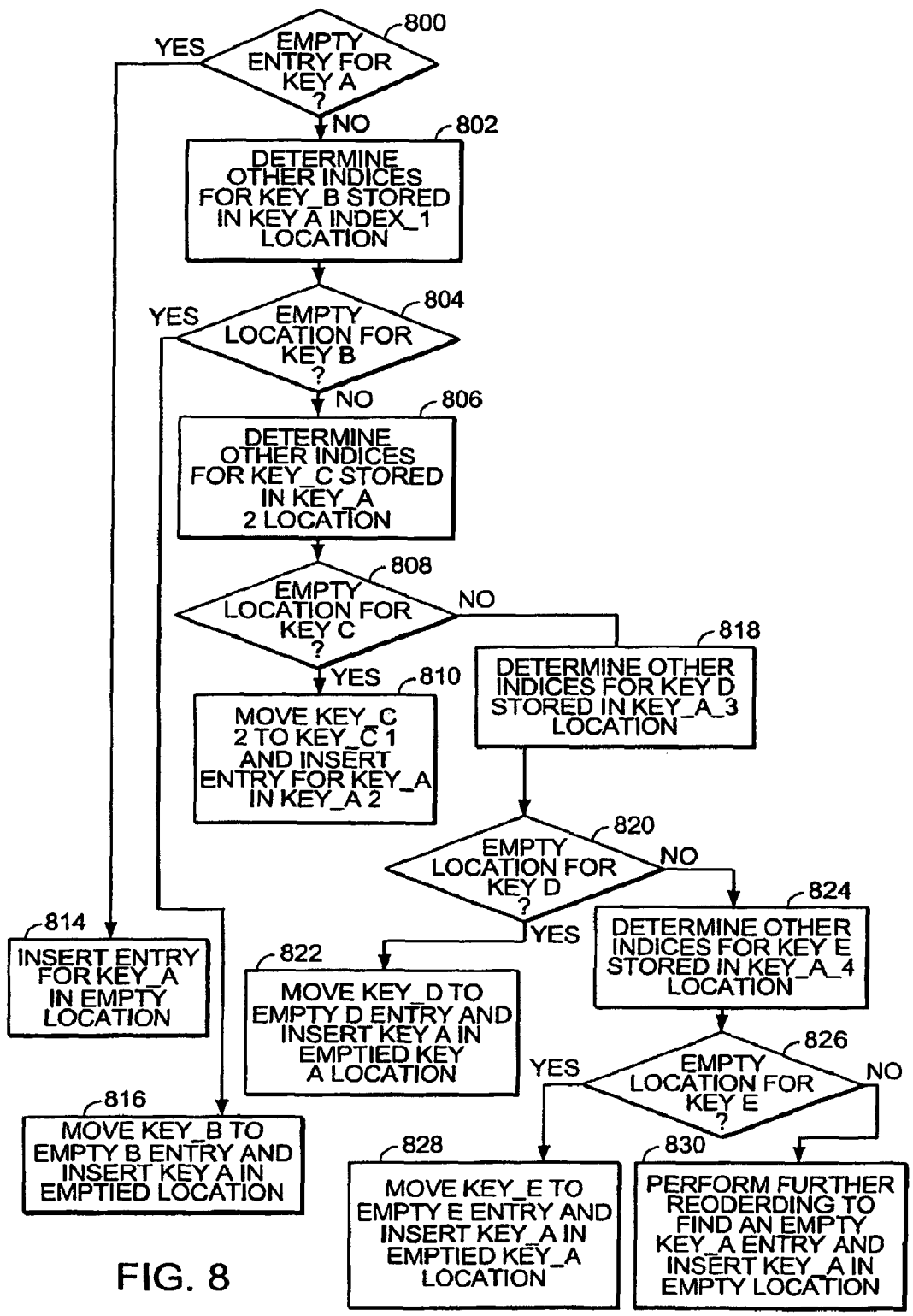
FIG. 8 is a flow chart illustrating the steps in the insert logic shown in FIG. 6 for recursively reordering the forwarding entries stored in the hash tables in order to free a location in the hash tables for inserting a forwarding entry.

FIG. 8 is a flow chart illustrating the steps in the forward entry insert logic 600 shown in FIG. 6 for reordering the forwarding entries in the hash tables 190A-D shown in FIG. 1B to insert Key_A in a location identified by the indices for Key_A 172A-D.

At step 800, having determined that Key_A is not stored at the locations identified by the indices for Key_A 172A-D, the forward entry insert logic 600 (FIG. 6) determines if any of the locations identified by the indices for Key A 172A-D are unused. If there is an unused location, no reordering of the forwarding entries is required and processing continues with step 814. If all the locations are used, reordering is required to provide an unused location identified by one of the indices for Key_A 172A-D in which to store Key_A and processing continues with step 802.

At step 802, the forward entry insert logic 600 (FIG. 6) determines from Key_B stored in location 138 identified by Key_A index_1 172A and Key_B index_1 174A, the other indices for Key_B 174B-D, in which Key_B may be stored. The forward entry insert logic 600 may determine the other indices for Key_B 174B-D by performing a hash function on Key_B to generate the indices for Key_B 174B-D or by using Key_B to index a recursive index table (not shown) in which the indices for Key_B 174B-D were stored when Key_B was inserted in location 138. Having determined the other indices associated with Key_B 174B-D processing continues with step 804.

At step 804, the forward entry insert logic 600 (FIG. 6) examines the forwarding entries stored at the locations 148, 158, 166 identified by the indices for Key_B 174B-D. As shown in FIG. 1B, Key_F is stored at location 148 identified by Key_B index_2 174B and Key_F index_2 182B, Key_H is stored at location 158 identified by Key B index$_{\_3}$ $_{174C}$ $_{and}$ $_{Key}$_H index_3 186C and Key_I is stored at location 166 identified by Key_B index_4 174D and Key_I index_4 188D. If all the locations 148, 158, 166 identified by the other indices for Key_B 174B-D are in-use as shown in FIG. 1B, processing continues with step 806. If the forward entry insert logic 600 (FIG. 6) finds one of the locations 148, 158, 166 identified by the other indices for Key_B 174B-D is unused, processing continues with step 816.

At step 806, the forward entry insert logic 600 (FIG. 6) determines from Key_C stored in location 146, the other indices for Key_C 176A, 176C-D other than the location identified by the Key_A index_2 172B and the Key_C index_2 176B, in which Key_C may be stored. Having determined the other indices associated with Key _C processing continues with step 808.

At step 808, the forward entry insert logic 600 (FIG. 6) examines the forwarding entries stored at the locations identified by the indices for Key_C 176A, 176D-C. As shown in FIG. 1B, location 140 identified by Key_C index_1 176A is unused, Key_G is stored at location 160 identified by Key_C Index_3 176C and Key_G index_3 184C and location 168 identified by Key_C index_4 176D is unused. If any of the locations 140, 160, 168 identified by the indices for Key_C 176A, 176C-D are unused as shown in FIG. 1B, processing continues with step 810. If the forward entry insert logic 600 (FIG. 6) finds none of the locations 140, 160, 168 identified by the indices for Key_C 176A, 176C-D are unused, processing continues with step 818.

At step 810, the forward entry insert logic 600 (FIG. 6) moves Key_C from location 146 identified by Key_C index_2 172B and Key_A index_2 172B to location 140 identified by Key_C index_1 176A. Key_A is inserted in location 146 identified by Key_A index_2 172B.

At step 814, Key_A is inserted in an unused location identified by one of the Key_A indices 172A-D.

At step 816, the forward entry insert logic 600 (FIG. 6) moves Key_B from location 138 identified by Key_A index_1 172A and Key_B index_1 174A to an unused location identified by one of the indices for Key_B 174B-D. Key_A is inserted in location 138 identified by Key_A index 1 172A and Key_B index_1 174A.

At step 818, the forward entry insert logic 600 (FIG. 6) determines from Key_D stored in location 156 identified by Key_A index_3 172C and Key_D index_3 178C, the other indices for Key_D 178A-B, 178D, in which Key_D may be stored. Having determined the other indices for Key_D processing continues with step 820.

At step 820, the forward entry insert logic 600 (FIG. 6) examines the keys stored at the locations identified by the other indices for Key_D 178A-B, 178D. As shown in FIG. 1B, all locations 142, 150, 170 identified by Key_D indices 178A-B, 178D are unused. If any of the locations 142, 150, 170 identified by the indices for Key_D 806A-B, 806D are unused as shown in FIG. 1B, processing continues with step 822. If the forward entry insert logic 600 (FIG. 6) finds none of the locations 142, 150, 170 identified by the indices for Key_D 178A-B, 178D is unused, processing continues with step 824.

At step 822, the forward entry insert logic 600 (FIG. 6) moves Key_D from location 156 identified by Key_A index_3 172C to one of the unused locations 142, 150, 170 identified by Key_D indices 178A-B, 178D. Key_A is inserted in location 156 identified by Key_D index 3 178C.

At step 824, the forward entry insert logic 600 (FIG. 6) determines from Key_E stored in location 164 identified by Key_A index_4 172D and Key_E index_4 180D, the other indices for Key_E 180A-C, in which Key_E may be stored. Having determined the other indices associated with Key_E processing continues with step 826.

At step 826, the forward entry insert logic 600 (FIG. 6) examines the keys stored at the locations identified by the other indices for Key_E 180A-C. As shown in FIG. 1B, locations 144, 152, 162 identified by indices for Key_E 180A-C are unused. If any of the locations 144, 152, 162 identified by the indices for Key_E 180A-C are unused as shown in FIG. 1B, processing continues with step 828. If the forward entry insert logic 600 (FIG. 6) finds none of the locations 144, 152, 162 identified by the indices for Key_E 180A-C is unused, processing continues with step 830.

At step 828, the forward entry insert logic 600 (FIG. 6) moves Key_E from location 164 identified by Key_A index_4 172D and Key_E index_4 180D to one of the locations 144, 152, 162 identified by the other indices for Key_E 180A-C. Preferably, Key_E is inserted in first empty location detected, that is, location 144 if the indices for Key_E 180A-C are being searched in the order A-C. Key A is inserted in location 164 identified by Key_A index_4 172D.

At step 830, the index selection logic 600 (FIG. 6) continues to search for an unused location by examining the forwarding entries stored at other locations shared by the Key_B, Key_C, Key_D and Key_E forwarding entries by examining all the forwarding entries associated with Key_F, Key_G, Key_H and Key_I until a forwarding entry at one of the Key_A indices 172A-D is emptied and Key_A is inserted.

In general, the locations identified by the indices for a key are searched in a predetermined order for example, in A-D order. The key is inserted in the first empty location found. Thus, the entry is inserted at the location identified by index_1 208A, followed by the location identified by index_2 208B, index_3 208C and index_4 208D.

Reordering the forwarding entries in the hash tables provides efficient utilization of the hash tables and increases the probability that a forwarding entry can be inserted in the hash tables when the hash tables are almost full.

Figure 9:
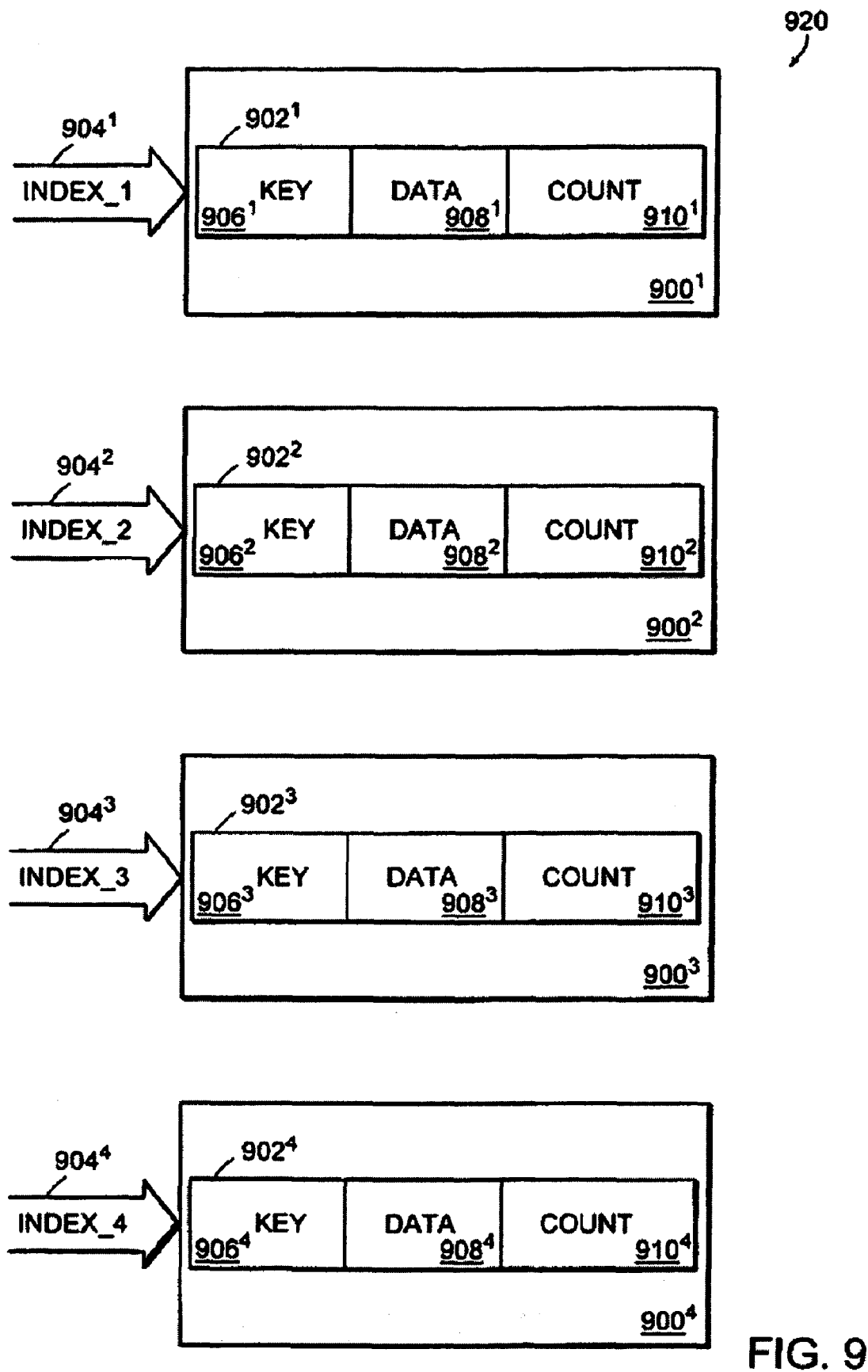
FIG. 9 is a block diagram of a multi-probe lookup table including a count field in each location for recording insert operations for all keys sharing the location according to the principles of the present invention.

FIG. 9 is a block diagram of a multi-probe lookup table 920 including a count field 910 in each indexed location 902 for recording insert operations for all keys sharing the location 902 according to the principles of the present invention. The lookup table 920 includes four separately indexed memories $900^1$-$900^4$ each including a location $902^1$-$902^4$ selected by a different index $904^1$-$904^4$. Each location $902^1$-$902^4$ includes a respective key field $906^1$-$906^4$, data field $908^1$-$908^4$ and count field $910^1$-$910^4$. Each of the key fields $906^1$-$906^4$ correspond to the key 420 (FIG. 4) and each of the data fields $908^1$-$908^4$ correspond to all of the other fields in the forwarding entry 210 described in conjunction with FIG. 4.

The data field 908 includes a logical port forward vector 412 (FIG. 4) associated with the key stored in the key field 906. The count field 910 stores a swap count that is dependent on the number of insert operations for all keys sharing the indexed location. Thus, the swap count is an indication of the congestion level of the indexed location 902. When all indexed locations for a particular key are full, the key is inserted into the table 920 by overwriting the previous key stored in the key field 906, and the previous data stored in the data field 908 the indexed location having the lowest swap count stored in the count field 910.

A swap count equal to one half of the maximum swap count is stored in the count field 910 after the first insertion of an entry into a location in the lookup table 920. In one embodiment, the swap field 910 has four bits, the maximum swap count is 16 and the swap count stored is 8 ($2^{4/2}$). Initializing the swap count to half the maximum swap count, allows the swap count to be incremented and decremented.

As described already in conjunction with FIG. 2, in a four-way hash table, four separate indexes are generated for each key. If all of the four indexed locations associated with a key are full, one of the indexed locations is overwritten with the new key. The indexed location to be overwritten is selected based on the swap count stored in the count field $910^{1-4}$ in each of the four indexed locations associated with the key. The swap count in each of the indexed locations is read and the indexed location with the lowest swap count is selected.

After the indexed location is selected, the swap count read from each of the indexed locations 902 is modified so that the total swap count for all of the indexed locations 902 associated with the key remains the same. The swap count stored in the count field 910 in the selected indexed location is incremented by the number of indexed locations minus 1. The swap count stored in the count field 910 in each of the other indexed locations is decremented by 1. For example, with four separately addressable memories 900, if each swap count is initially 8, the swap count in the location selected to be overwritten is incremented by 3 (4−1) resulting in a swap count of 11 and the swap count in the other three locations is decremented by 1 resulting in a swap count of 7. The sum of the swap counts for the indexes for the key is 32 (8×4) before the insert operation and 32 (11+(7×3)) after the insert operation. The modified swap count is written to each indexed location associated with the key and the old key and associated data is overwritten with the new key and associated data in the selected indexed location. With a higher swap count, the overwritten location is less likely to be selected for overwriting by another key sharing the selected location.

Figure 10:
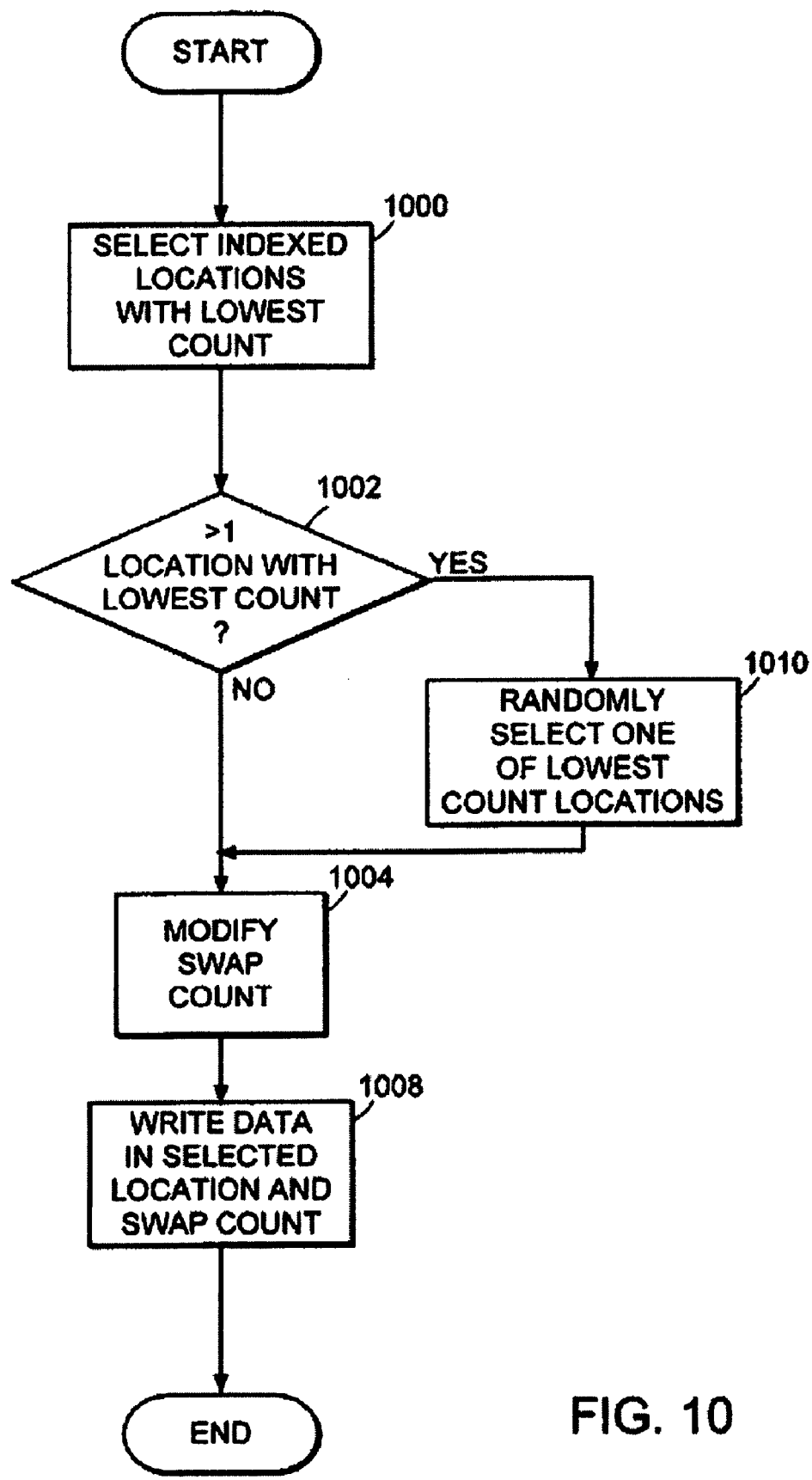
FIG. 10 is a flowchart illustrating the method for inserting an entry including a key and associated data into the multi-probe lookup table shown in FIG. 9.

FIG. 10 is a flowchart illustrating the method for inserting an entry including a key and associated data into the multi-probe lookup table shown in FIG. 9. FIG. 10 replaces step 712 in FIG. 7. Instead of randomly selecting one of the indexed locations, the location can be selected dependent on swap values stored in each of the indexed locations.

At step 1000, the entries stored at each location specified by each of the four indexes have been read and there is no empty location as discussed in conjunction with steps 704, 716 and 706 in FIG. 7. The swap count in the count field in each location has been initialized to a value equal to one half of the maximum count value. The swap count is initialized on the first insert of a key in the location. The indexed locations having the lowest swap count stored in the count field 910 (FIG. 9) are selected for inserting the key. Processing continues with step 1002.

At step 1002, the forward entry insert logic 600 (FIG. 6) determines if there is more than one indexed location storing the lowest swap count. If so, processing continues with step 1010. If not, the indexed location with the lowest swap count is selected to be overwritten. Processing continues with step 1004.

At step 1004, the swap count read from each indexed location is modified. The swap count in the indexed location selected to be overwritten is incremented by n−1 (where n is the number of indexed locations read). The swap count in the other indexed locations is decremented by one. Processing continues with step 1008.

At step 1008, the modified swap count is written to the selected indexed location and the modified swap count for the other indexed location is written to the other indexed locations. The key and associated data is written to the selected indexed location. Processing is complete.

At step 1010, one of the indexed locations storing the lowest swap count is randomly selected to be overwritten. Processing continues with step 1004.

FIGS. 11A-11E illustrate modification of the swap count when inserting entries into the multi probe hash table shown in FIG. 9.

Figure 11A:
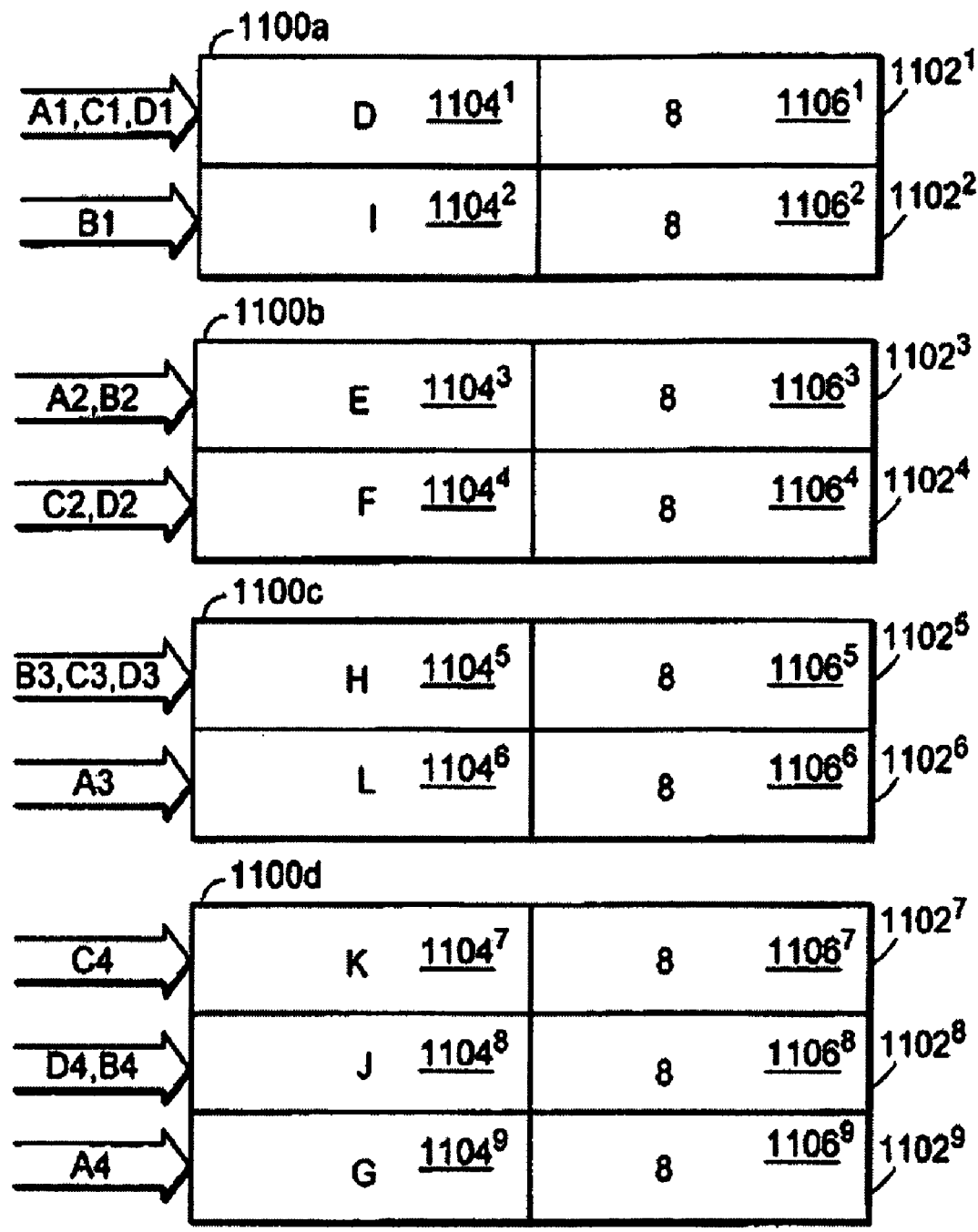
FIGS. 11A-11E illustrate modification of the swap count when inserting entries into the multi-probe table lookup shown in FIG. 9.

FIG. 11A illustrates indexed locations 1102$^1$-1102$^9$ in the lookup table including four separately indexed memories 1100A-1100D. Each indexed location 1102$^1$-1102$^9$ stores an entry including a key 1104 and a swap count 1106. In the embodiment shown, with four separately indexed memories 1100A-1100D, the swap count 1106 in each indexed location 1102 is initialized to 8 ($2^{4/2}$). Each key indexes one location 1102 in each of the separately indexed memories 1100A-1100D. For example, Key B has four indexes B1, B2, B3 and B4. Index B1 indexes location 1102$^2$ in memory 1100A, index B2 indexes location 1102$^3$ in memory 1100B, index B3 indexes location 1102$^5$ in memory 1100C and index B4 indexes location 1102$^8$ in memory 1100D. Many locations 1102$^1$-1102$^9$ are shared by multiple keys. As shown, location 1102$^1$ in memory 1100A is shared by keys A, C and D, location 1102$^3$ in memory 1100B is shared by keys A and B and location 1102$^4$ in memory 1100B is shared by keys C and D. Keys D-L are stored in indexed locations 1102$^1$-1102$^9$ in the lookup table. All indexed locations for storing Keys A-C are already storing other keys. Thus, to insert new Key A, B or C, one of the indexed locations associated with the respective key must be overwritten. For example, one of indexed location 1102$^1$ in memory 1100A storing Key D, indexed location 1102$^3$ in memory 1100B storing Key E, indexed location 1102$^6$ in memory 1100C storing key L or indexed location 1102$^9$ in memory 1100D storing key G can be overwritten to insert Key A.

Figure 11B:
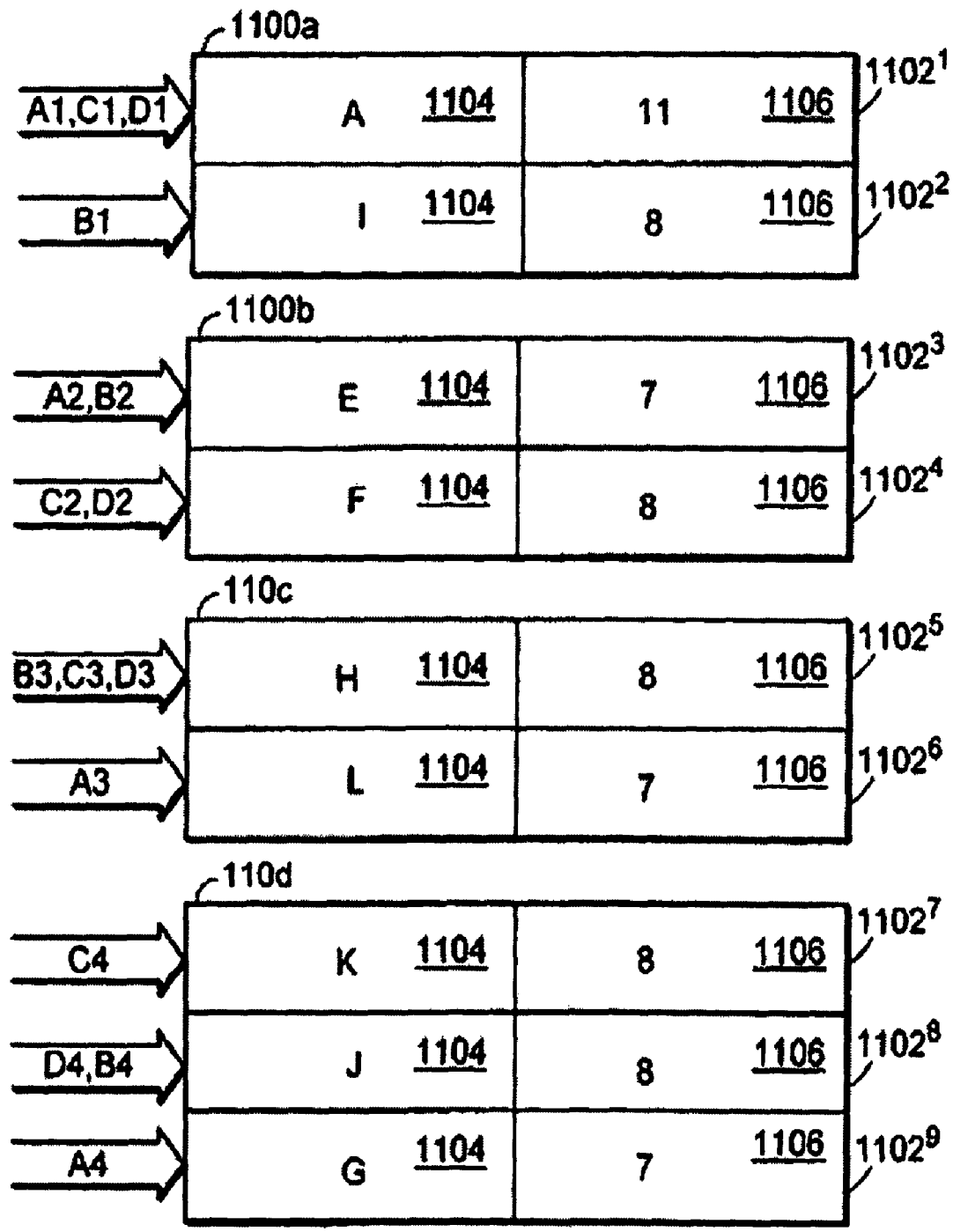

FIG. 11B illustrates the swap counts stored in locations 1102$^1$-1102$^9$ in the lookup table after inserting Key A into the lookup table. As shown, Key A can be inserted into any of locations 1102$^1$, 1102$^3$, 1102$^6$ and 1102$^9$. Prior to the insert of Key A, each of the locations 1102$^1$, 1102$^3$, 1102$^6$, 1102$^9$ has a swap count of 8 as shown in FIG. 11A. The insert logic randomly selects location 1102$^1$. A CRC generator or Linear Feedback Shift Register, both well-known to those skilled in the art can be used to randomly select the location to overwrite. For example, if there are four separately addressable memories 1100A-D, the state of the two Least Significant Bits (LSB) of the key can be used to select one of the four memories. Key A is stored in location 1102$^1$ and the swap count in location 1102$^1$ is incremented by three to 11. The insertion of Key A into the lookup table resulted in overwriting Key D previously stored in location 1102$^1$. The swap count in the other locations 1102$^3$, 1102$^6$, 1102$^9$ for Key A is decremented by one to 7.

Figure 11C:
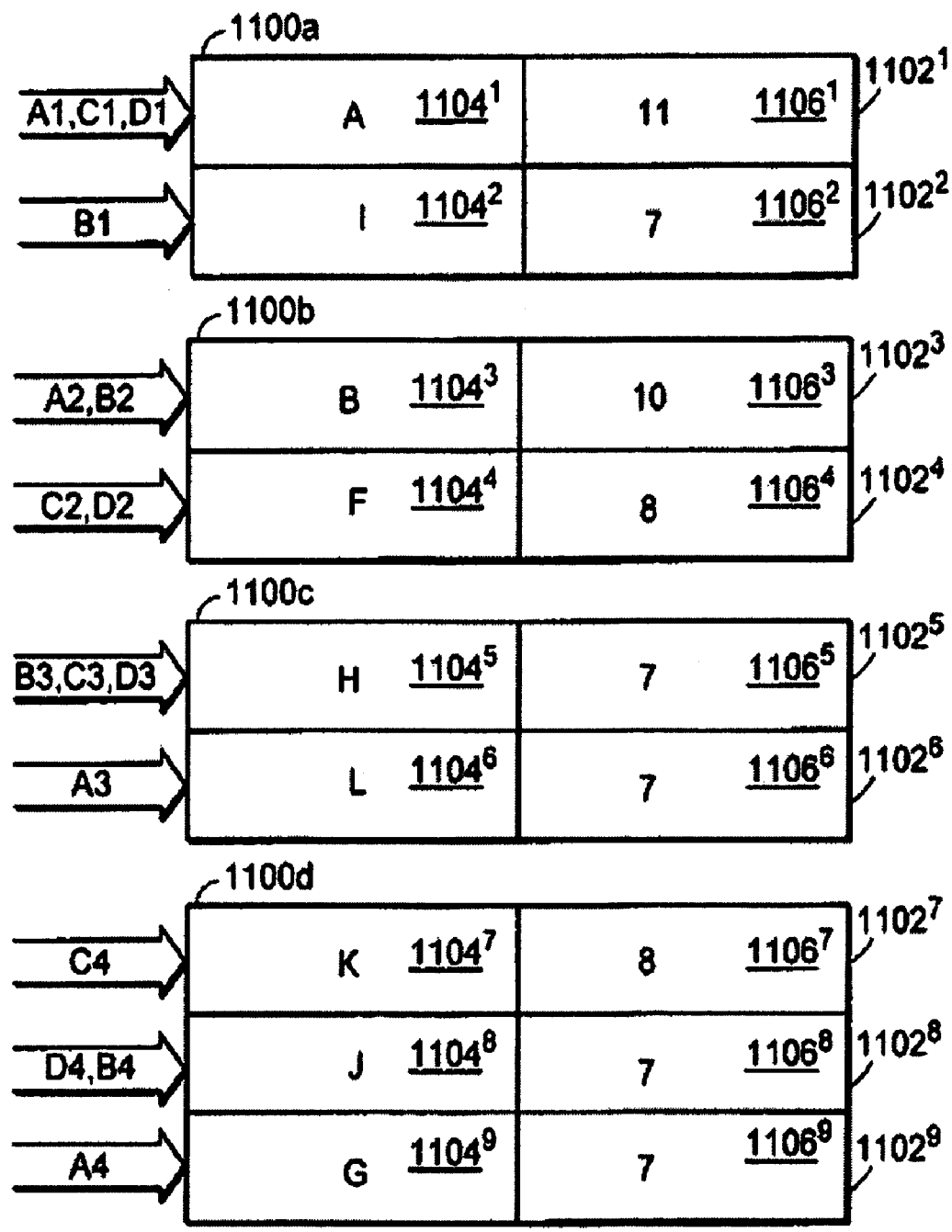

FIG. 11C illustrates swap counts stored in locations 1102$^1$-1102$^9$ in the lookup table after inserting Key B into the lookup table. Returning to FIG. 11B, Key B can be inserted into any of locations 1102$^2$, 1102$^3$, 1102$^5$ and 1102$^8$. Location 1102$^3$ stores a swap count of 7 and locations 1102$^2$, 1102$^5$ and 1102$^8$ each store a swap count of 8. Thus, location 1102$^3$ with the lowest swap count; that is, 7 is selected to be overwritten. Returning to FIG. 11C, Key B is stored in location 1102$^3$ and the swap count in location 1102$^3$ is incremented by 3 to 10. The swap count in each of the other locations 1102$^2$, 1102$^5$ and 1102$^8$ for key B is decremented by one to 7.

Figure 11D:
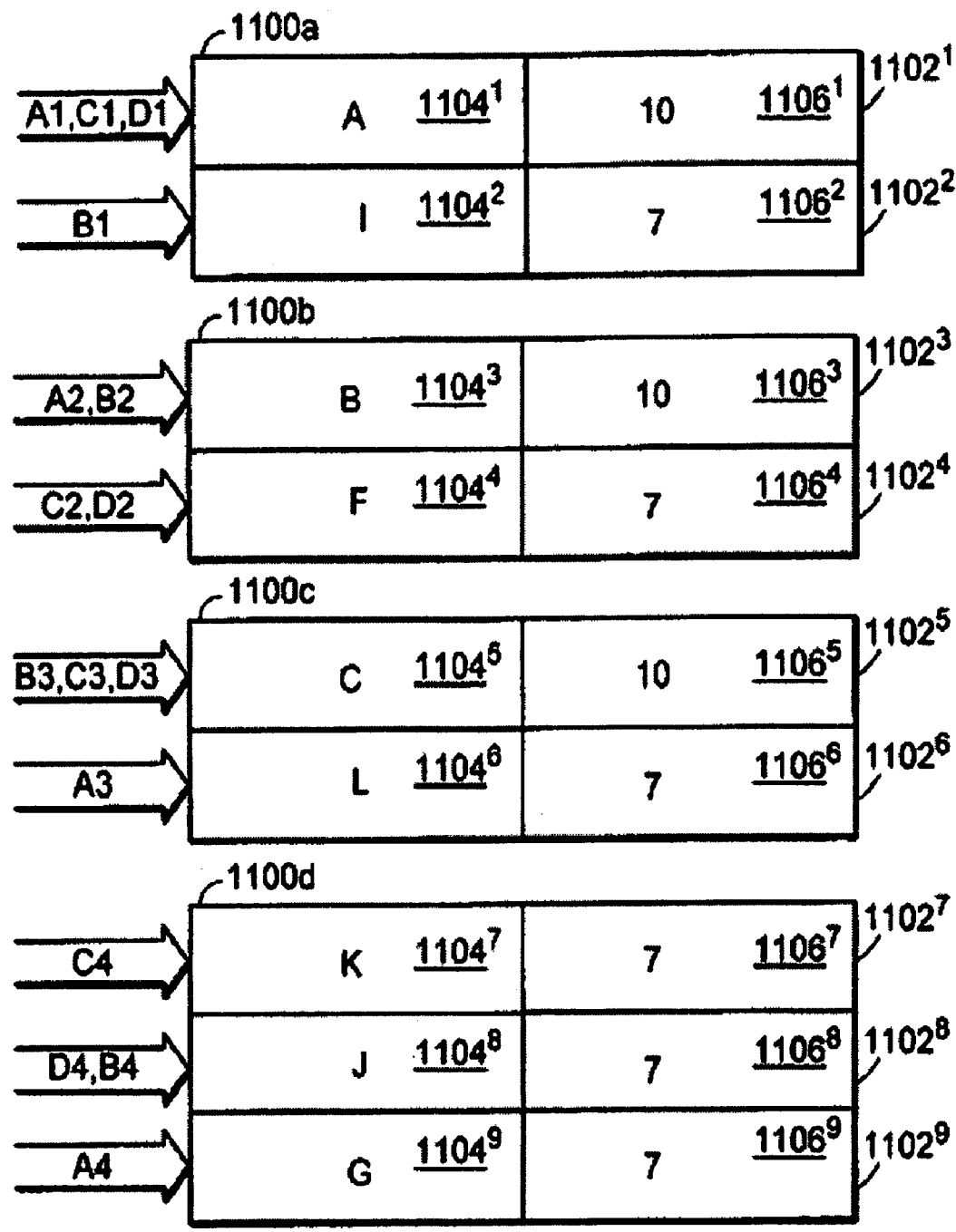

FIG. 11D illustrates locations 1102″ in the lookup table after inserting Key C into the lookup table. Returning to FIG. 11C, Key C can be inserted into any of locations 1102$^1$, 1102$^4$, 1102$^5$ and 110$^7$. Location 1102$^1$ has a swap count of 11. Locations 1102$^4$ and 1102$^7$ each have a swap count of 8. Location 1102$^5$ has a swap count of 7. Returning to FIG. 11D, Key C is stored in location 1102$^5$, the location having the lowest swap count. The swap count in location 1102$^5$ has been incremented by 3 to 10. The swap count in location 1102$^1$ has been decremented by one to 10. The swap count in location 1102$^4$ has been decremented by one to 7 and the swap count in location 1102$^7$ has been decremented by one to 7. The insertion of Key C into location 1102$^5$ in the lookup table resulted in overwriting Key H previously stored in location 1102$^5$.

Figure 11E:
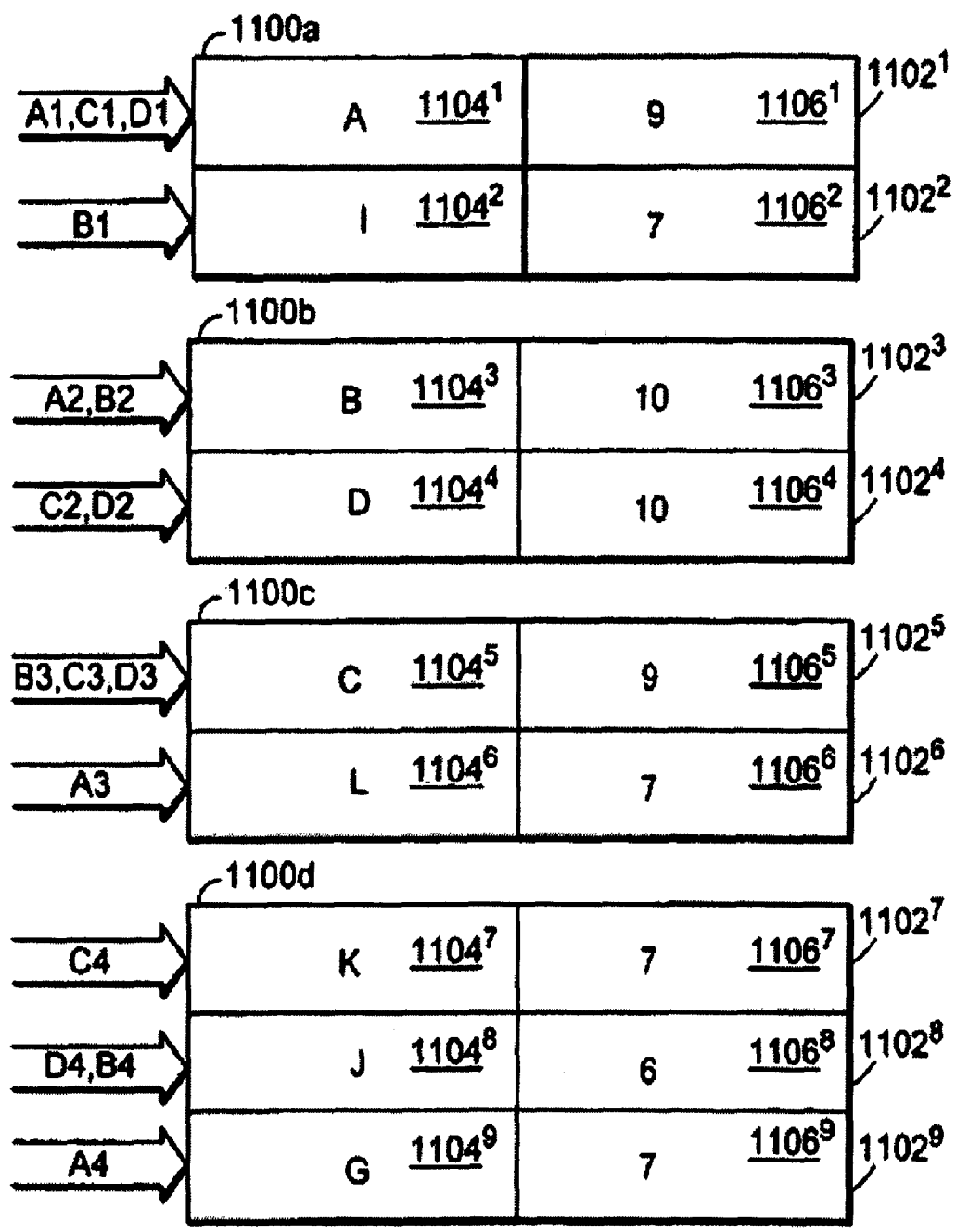

FIG. 11E illustrates locations 1102.sub.1-9 in the lookup table after re-inserting Key D into the lookup table. As already discussed in conjunction with FIG. 11B, the insertion of Key A into the lookup table resulted in overwriting Key D previously stored in location 1102$^1$. Returning to FIG. 11D, Key D can be inserted into any of locations 1102$^1$, 1102$^4$, 1102$^5$ and 1102$^8$. Location 1102$^8$ with a swap count of 7 has the lowest swap count. Returning to FIG. 11E, Key D is inserted in location 1102$^4$ and Key F previously stored in location 1102$^4$ is overwritten. The swap count in location 1102$^4$ is incremented by 3 to 10. The swap count in locations 1102$^5$ and 1102$^1$ is decremented by 1 to 9 and the swap count in location 1102$^8$ is decremented by one to 6.

The swap count allows uniform distribution of keys stored in the lookup table by re-ordering keys sharing the indexed location. Thrashing is reduced by inserting keys into the lookup table based on the distribution of keys already stored in the lookup table.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A system generating a plurality of network-related tables during system operation, a number of the network-related tables each being separately indexed by a different index, the system comprising:
   a network switch;
   insert logic configured to store, at each indexed location, a swap count providing an indication of a congestion level of the indexed location;
   the insert logic further configured to: i) insert, when a predetermined condition has been satisfied, a new entry by incrementing a current entry stored in an indexed location having a lowest swap count; and ii) decrement the swap counts in each of the remaining indexed locations; and the network switch configured to forward data packets from ingress ports to egress ports based at least in part on forwarding entries associated with the indexed locations.

2. The system as claimed in claim 1, wherein the insert logic is configured to maintain a total swap count to be substantially constant over time.

3. The system as claimed in claim 1, wherein an overwritten indexed location has a first swap count associated with the overwritten index, and said first swap count is incremented by an amount equal to one quarter of a maximum swap count less one.

4. The system as claimed in claim 3, wherein said maximum swap count is based on a positive power of two.

5. The system as claimed in claim 3, wherein said amount is 3.

6. The system as claimed in claim 1, wherein said predetermined condition is detection that all locations identified by the indexes are used.

7. The system as claimed in claim 1, wherein upon detecting a plurality of indexed locations storing the lowest swap count, one of the indexed locations is randomly selected for inserting the new entry.

8. A computer-implemented method comprising:
   storing a number of tables on a computer readable storage medium, each table separately indexed by a different index; storing a swap count in each indexed location, the swap count providing an indication of congestion level of the indexed location;
   upon satisfaction of a predetermined condition, inserting a new entry in a table stored on the computer readable storage medium by incrementing a current entry stored in an indexed location storing a lowest swap count;
   decrementing swap counts in each of the remaining indexed locations; and
   forwarding data packets from ingress ports to egress ports of a network switch based at least in part on forwarding entries associated with the indexed locations.

9. The computer-implemented method as in claim 8, wherein decrementing swap counts comprises maintaining a total swap count to be substantially constant over time.

10. The computer-implemented method as in claim 8, wherein the overwritten indexed location has an associated first swap count, and said associated first swap count is incremented, during the updating of the swap counts, by an amount equal to one quarter of a maximum swap count less one.

11. The computer-implemented method as in claim 10, wherein said maximum swap count is based on a positive power of two.

12. The computer-implemented method as in claim 10, wherein said amount is 3.

13. The computer-implemented method as in claim 8, wherein said predetermined condition is detection that all indexed locations are in use.

14. The computer-implemented method as in claim 8, further comprising randomly selecting, upon detecting a plurality of indexed locations storing the lowest swap count, one of the indexed locations for inserting the new entry.

15. A network switch comprising:
   ingress ports and egress ports;
   a plurality of tables on a storage medium on the network switch storing forwarding decisions for data packets forwarded from ingress ports to egress ports, a number of the tables each being separately indexed by a different index computed from a key, each indexed location storing a swap count, the swap count providing an indication of the congestion level of the indexed location;
   insert logic on the network switch which, when a predetermined condition has been satisfied, inserts a new entry by incrementing the current entry stored in the indexed location storing the lowest swap count and decrementing the swap counts in each of the remaining indexed locations; and
   control on the network switch that forwards data packets to the egress ports according to the forwarding decisions stored in the plurality of tables on the storage medium on the network switch.

16. The network switch as claimed in claim 15, wherein upon detecting a plurality of indexed locations storing the lowest swap count, one of the indexed locations is randomly selected for inserting the new entry.

17. The network switch as claimed in claim 15, wherein the first swap count is incremented by the number of second swap counts and each of the second swap counts is decremented by one.

18. The network switch as claimed in claim 17 wherein the number of second swap counts is 3.

19. A method for storing entries in a network switch comprising the steps of:
   providing ingress ports and egress ports;
   providing a plurality of tables on a storage medium on the network switch storing forwarding decisions for forwarding data packets among the ingress ports and the egress ports, a number of the tables each being separately indexed by a different index computed from a key;
   storing a swap count in each indexed location, the swap count providing an indication of the congestion level of the indexed location;
   when a predetermined condition has been satisfied, inserting a new entry by incrementing the current entry stored in the indexed location storing the lowest swap count;
   decrementing the swap counts in each of the remaining indexed locations; and
   forwarding data packets to the egress ports according to the forwarding decisions stored in the plurality of tables on the storage medium on the network switch.

20. The method as claimed in claim 19, wherein, upon detecting a plurality of indexed locations storing the lowest swap count, one of the indexed locations is randomly selected for inserting the new entry.

21. The method as claimed in claim 19, wherein the first swap count is incremented by the number of second swap counts and each of the second swap counts is decremented by one.

22. The method as claimed in claim 21, wherein the number of second swap counts is 3.

* * * * *